US012579081B2

(12) United States Patent
Amato et al.

(10) Patent No.: US 12,579,081 B2
(45) Date of Patent: Mar. 17, 2026

(54) MEMORY APPARATUS FOR PROVIDING RELIABILITY, AVAILABILITY, AND SERVICEABILITY

(71) Applicant: Micron Technology, Inc., Boise, ID (US)

(72) Inventors: Paolo Amato, Treviglio (IT); Marco Sforzin, Cernusco Sul Naviglio (IT); Stephen S. Pawlowski, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 215 days.

(21) Appl. No.: 18/215,434

(22) Filed: Jun. 28, 2023

(65) Prior Publication Data

US 2024/0004807 A1     Jan. 4, 2024

Related U.S. Application Data

(60) Provisional application No. 63/357,515, filed on Jun. 30, 2022.

(51) Int. Cl.
*G06F 13/16*          (2006.01)
(52) U.S. Cl.
CPC ................................. *G06F 13/161* (2013.01)

(58) Field of Classification Search
CPC ........................... G06F 13/161; G06F 11/1048
See application file for complete search history.

(56) References Cited

U.S. PATENT DOCUMENTS

| | | | |
|---|---|---|---|
| 11,687,273 B2 | 6/2023 | Confalonieri et al. | |
| 2019/0340067 A1* | 11/2019 | Kim .................... | G06F 13/1668 |
| 2019/0347043 A1* | 11/2019 | Hasbun ............... | G06F 12/0238 |

OTHER PUBLICATIONS

U.S. Appl. No. 17/831,433, filed Jun. 2, 2022, titled "Write Command Execution for Data Protection and Recovery Schemes", 42 pages.

* cited by examiner

*Primary Examiner* — Zachary K Huson
(74) *Attorney, Agent, or Firm* — Brooks, Cameron & Huebsch, PLLC

(57) ABSTRACT
A channel width can depend on a quantity of memory units (e.g., memory dice) that forms a channel as well as a size of the memory units. A memory system can operate with memory units configured to exchange (e.g., transfer to and/or from) data at a rate of smaller granularity that can provide more various options for channel widths, which can further allow a fine-tuned optimization of the memory system in association with its bandwidth and latency in transferring data from and/or to the memory units. The memory system with such memory units implemented can still provide a degree of data integrity and/or data authenticity required by standardized requirements and/or protocols, such as trusted execution engine security protocol (TSP).

20 Claims, 12 Drawing Sheets

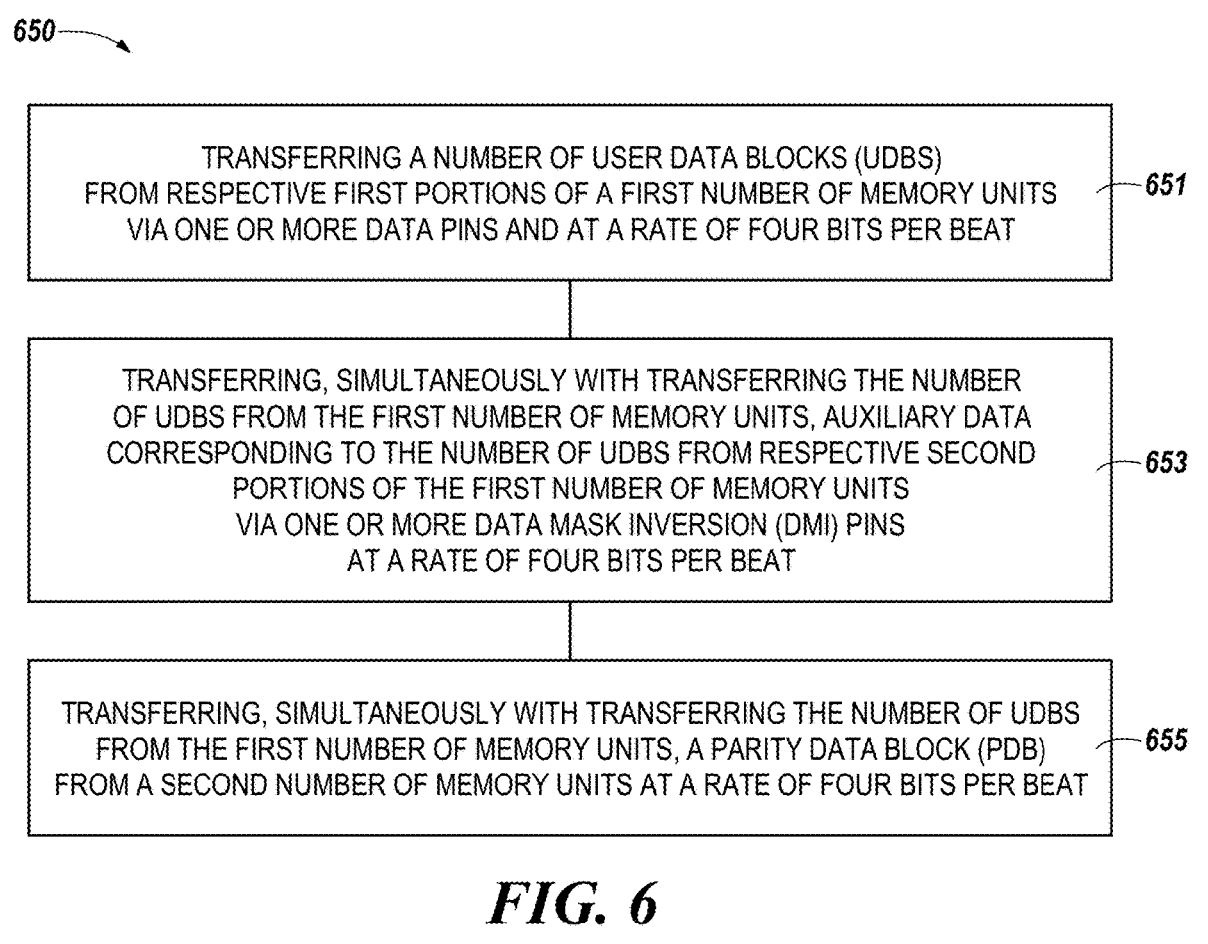

650 ⟍

```
┌────────────────────────────────────────────────────────────┐
│         TRANSFERRING A NUMBER OF USER DATA BLOCKS (UDBS)     │
│  FROM RESPECTIVE FIRST PORTIONS OF A FIRST NUMBER OF MEMORY UNITS  │── 651
│   VIA ONE OR MORE DATA PINS AND AT A RATE OF FOUR BITS PER BEAT    │
└────────────────────────────────────────────────────────────┘
                              │
┌────────────────────────────────────────────────────────────┐
│   TRANSFERRING, SIMULTANEOUSLY WITH TRANSFERRING THE NUMBER  │
│    OF UDBS FROM THE FIRST NUMBER OF MEMORY UNITS, AUXILIARY DATA  │
│  CORRESPONDING TO THE NUMBER OF UDBS FROM RESPECTIVE SECOND   │── 653
│        PORTIONS OF THE FIRST NUMBER OF MEMORY UNITS          │
│        VIA ONE OR MORE DATA MASK INVERSION (DMI) PINS        │
│               AT A RATE OF FOUR BITS PER BEAT                │
└────────────────────────────────────────────────────────────┘
                              │
┌────────────────────────────────────────────────────────────┐
│  TRANSFERRING, SIMULTANEOUSLY WITH TRANSFERRING THE NUMBER OF UDBS │
│   FROM THE FIRST NUMBER OF MEMORY UNITS, A PARITY DATA BLOCK (PDB) │── 655
│ FROM A SECOND NUMBER OF MEMORY UNITS AT A RATE OF FOUR BITS PER BEAT │
└────────────────────────────────────────────────────────────┘
```

*FIG. 6*

MEMORY APPARATUS FOR PROVIDING RELIABILITY, AVAILABILITY, AND SERVICEABILITY

PRIORITY INFORMATION

This application claims the benefit of U.S. Provisional Application No. 63/357,515, filed on Jun. 30, 2022, the contents of which are incorporated herein by reference.

TECHNICAL FIELD

The present disclosure relates generally to semiconductor memory and methods, and more particularly, to apparatuses, systems, and methods related to a memory apparatus for providing reliability, availability, and serviceability (RAS).

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 6 is a flow diagram of a method for memory units for memory system operations in accordance with a number of embodiments of the present disclosure.

DETAILED DESCRIPTION

Figure 1:
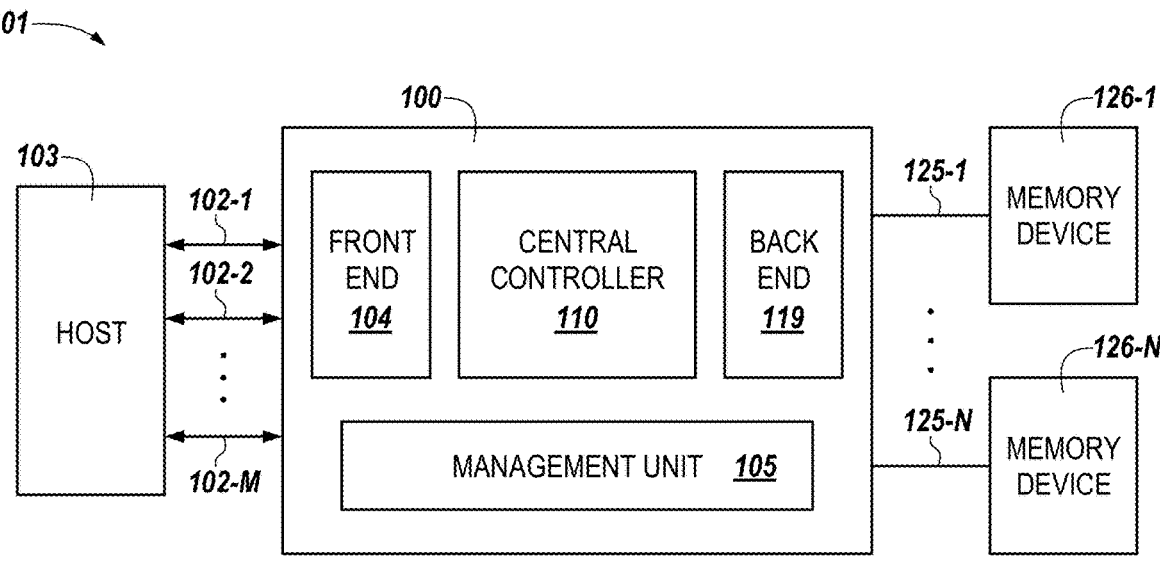
FIG. 1 is a functional block diagram of a computing system including a memory controller in accordance with a number of embodiments of the present disclosure.

Systems, apparatuses, and methods related to providing reliability, availability, and serviceability for memory system are described. Various embodiments of the present disclosure include a memory system having memory units (e.g., memory dice) that operate to be compliant with various requirements of a protocol, such as a compute express link (CXL) (e.g., CXL 3.0 that is built based on Peripheral Component Interconnect Express (PCIe) 6.0)). One aspect of the memory architecture utilizes memory dice each configured to provide four bits per beat (referred to as "x4 mode"). Another aspect of the memory architecture utilizes different types of pins for exchanging (transferring to and/or from) non-user data (alternatively referred to as "auxiliary data"). These aspects of the memory architecture as combined can allow the memory system to operate to meet various requirements and/or goals of the CXL, which can require a memory system to operate with high reliability (by providing a chip kill scheme), high bandwidth, low latency, a capability to manage auxiliary data (e.g., metadata), and/or a capability to support advanced security features (e.g., security features involving message authentication code (MAC) and/or Advanced Encryption Standard (AES)). As used herein, a chip kill scheme protects the memory system even if a constituent chip is damaged; thereby, avoiding a situation of one of the chips being a single point of failure (SPOF) of the memory system.

By using memory dice with a x4 mode as compared to the other modes having a larger granularity (e.g., x8 or x16 mode), the operation of the memory system can be fine-tuned, which provides a better optimization of the operation that the x8 or x16 mode may not be capable of providing. For example, the RAS (Reliability, Availability, and Serviceability) protection (e.g., chip kill scheme) can be provided by accessing a channel constituting a configurable number of memory dice each operating with a particular mode. In some embodiments, the RAS protection can be provided with two 20-bit wide channels (with each channel including five memory dice with the x4 mode) that might provide a better optimization of the memory system (in terms of system bandwidth and/or latency) over 16-bit or 24-bit wide channels that memory dice with a x8 or x16 mode are capable of providing.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 126 via the PCIe 5.0 or 6.0 interface 206 according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

An error correction operation can be performed to provide error correction capabilities with various granularities. In one example, an error correction operation, when performed (e.g., at the ECC decoders 216-2 and/or 316-2 as illustrated in FIGS. 2 and 3, respectively), can provide an error correction capability of correcting a particular quantity of (e.g., bit) errors, while further providing an error detection capability of detecting errors (without correcting those) beyond the particular quantity. While this error correction capability may not be capable of protecting a memory device 226 from its complete failure, another error correction operation, such as a chip kill operation, can provide an error correction capability to restore a memory device 126 despite of its complete failure.

A chip kill operation protects the memory system even if a constituent chip (e.g., the memory device 126) is damaged; thereby, avoiding a situation of one of the chips being a single point of failure (SPOF) of the memory system. Often, the chip kill capability is provided through various error correction code (ECC) schemes including a "Redundant Array of Independent Disks" (RAID) scheme, a low-power chip kill (LPCK) scheme, etc., which allow data recovery of the damaged chip by reading all of the constituent chips of the memory system.

The chip kill can involve parity data (e.g., RAID parity or LPCK parity) that are specifically designed for data recovery of the damaged chip. The user data that share the same parity data can be referred to as being grouped together.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a twenty-pin data bus (e.g., data input/output (DQ) bus) and a five-pin data mask inversion (DMI) bus, among other possible buses.

The memory devices 126 can be various/different types of memory devices. For instance, the memory device can include RAM, ROM, DRAM, SDRAM, PCRAM, RRAM, and flash memory, among others. In embodiments in which the memory device 126 includes persistent or non-volatile memory, the memory device 126 can be flash memory devices such as NAND or NOR flash memory devices. Embodiments are not so limited, however, and the memory device 126 can include other non-volatile memory devices such as non-volatile random-access memory devices (e.g., non-volatile RAM (NVRAM), ReRAM, ferroelectric RAM (FeRAM), MRAM, PCRAM), "emerging" memory devices such as a ferroelectric RAM device that includes ferroelectric capacitors that can exhibit hysteresis characteristics, a memory device with resistive, phase-change, or similar memory cells, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

In another example, the memory devices 126 can be dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of a memory transfer block (MTB) that includes a number of user data blocks (UDBs). As used herein, the term "MTB" refers to a group of UDBs that are grouped with a same parity data block (PDB) (e.g., share a same PDB); therefore, are transferred together from a cache (e.g., the cache 212) and/or memory devices 126 for each read or write command. For example, the group of UDBs of the same MTB can be transferred to/from (e.g., written to/read from) the memory devices 126 via the channels 126 over a predefined burst length (e.g., a 32-bit BL) that the memory controller 100 operates with. A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers.

As used herein, the term "PDB" refers to a data block containing parity data (e.g., LPCK parity data in forms of one or more parity symbols) configured for a chip kill (e.g., LPCK and/or RAID) operation on UDBs that are grouped with the PDB. As further described herein, an MTB can be in a plain text or cypher text form depending on whether the MTB has been encrypted at the memory controller 100 (e.g., the security encoder 217-1 and/or 317-1).

As used herein, the term "UDB" refers to a data block containing host data (e.g., received from the host 103 and alternatively referred to as "user data"). In some embodiments, host data included in an UDB can be in forms of one or more data symbols (e.g., multi-bit symbols), which can be a non-binary symbol. For example, non-binary symbol(s) having N bits can be one of $2^N$ elements of a finite Galois field.

An MTB can be a unit of read access to the memory devices 126. For example, even when a host read command (e.g., read command received from the host 103) is received to read just one UDB, all the other data blocks (e.g., UDBs and/or PDB) that are grouped together with the UDB (e.g., requested by the host read command) can be transferred to the memory controller 100. As described further herein, the data blocks that are transferred together can be used for a chip kill operation at the memory controller 100 and just the UDB requested by the host read command can be further sent to the host 103. In some embodiments, the MTB read from the memory devices 126 can be stored in a cache (e.g., the cache 212 illustrated in FIG. 2), from which a requested UDB can be further sent to the host 103.

An MTB can also be a unit of write access to the memory devices 226. For example, when a host write command to update one of UDBs of an MTB is received at the memory controller 100, the memory controller 100 reads the MTB from the memory devices 126 or the cache 212, update the UDB as well as a PDB of the MTB, and write the updated MTB back to the memory devices 126 and/or the cache 212. In some embodiments, a cache line of the cache 212 can correspond to an MTB (e.g., 128 bytes corresponding to two UDBs).

Along with the MTB, a PDB can be also transferred between the back end portion 119 and the memory devices 126. The host data or the parity data of a single UDB or PDB can correspond to multiple codewords (e.g., 64 codewords).

Along with the MTB, other "extra" bits of data (e.g., other data in addition to data corresponding to an MTB and alternatively referred to as "auxiliary data") can also be transferred between the back end portion 119 and the memory devices 126. The extra data can include data used to correct and/or detect errors in MTB and/or authenticate and/or check data integrity of the MTB, and/or metadata, although embodiments are not so limited. Further details of the extra bits are illustrated and described in connection with FIGS. 2-5.

In some embodiments, some (e.g., one or more) memory devices 126 can be dedicated for PDBs. For example, memory devices configured to store UDBs can be different from a memory device (e.g., one or more memory devices) configured to store PDBs.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2A:
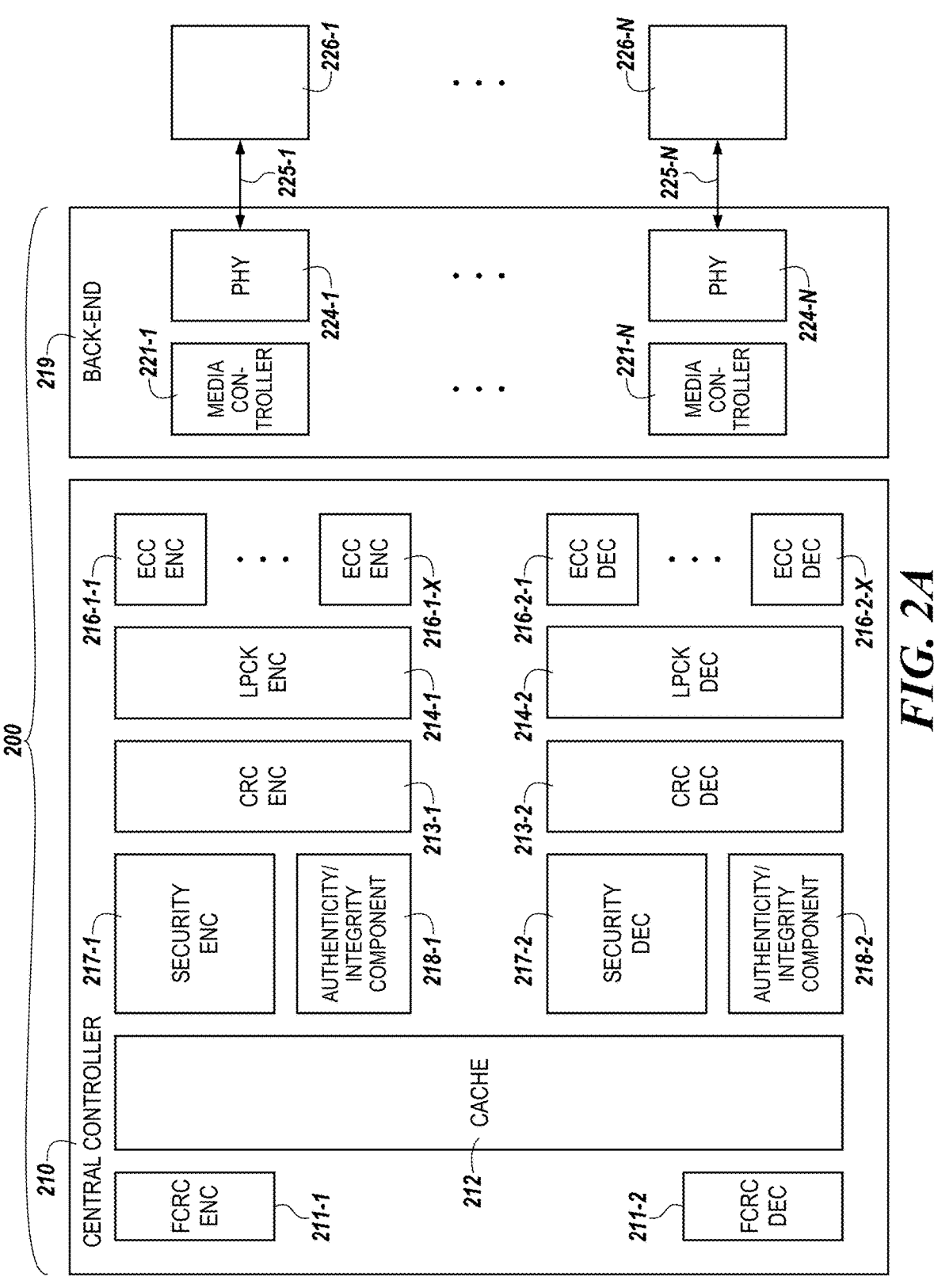
FIG. 2A is a functional block diagram of a memory controller having a low-power chip kill (LPCK) encoder/decoder in accordance with a number of embodiments of the present disclosure.

FIG. 2A is a functional block diagram of a memory controller 200 having an authenticity/integrity component (e.g., an authenticity/integrity check encoder/decoder 218-1/218-2 that are respectively shown as "AUTHENTICITY/INTEGRITY ENC" 218-1 and "AUTHENTICITY/INTEGRITY DEC" 218-2 in FIG. 2A) and a pair of front-end CRC encoder/decoder 211 (alternatively referred to and shown as "FCRC" in FIG. 2A) in one configuration in accordance with a number of embodiments of the present disclosure. The memory controller 200, the back end portion 219, and the memory devices 226 illustrated in FIG. 2A are analogous to the memory controller 100, the back end portion 119, and the memory devices 126 illustrated in FIG. 1.

The central controller portion 210 includes a FCRC encoder 211-1 (e.g., paired with a FCRC decoder 211-2) to generate error detection information (e.g., alternatively referred to as end-to-end CRC (e2e CRC)) based on data (e.g., corresponding to an UDB and in "plain text" form) received as a part of a write command (e.g., received from the host 103) and before writing the data to the cache 212. The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to an UDB.

The central controller portion 210 includes a cache 212 to store data, error detection information, error correction information, and/or metadata associated with performance of the memory operation. An example of the cache 212 is a thirty-two (32) way set-associative cache including multiple cache lines. While read and write commands of CXL memory systems can be a size of an UDB (e.g., 64 bytes), the cache line size can be equal to or greater than a size of an UDB. For example, the cache line size can correspond to a size of an MTB. In an example where an MTB includes 2 UDBs (with each UDB being a 64-byte chunk), for example, each cache line can include 128 bytes of data.

Data (e.g., UDBs and/or MTB) corresponding to a cache line and stored in the cache 212 can be further transferred to the other components (e.g., a security encoder 217-1 and/or an authenticity/integrity check encoder 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data before transferring the data to a CRC encoder 213-1 (to write the data to the memory devices 226). Although embodiments are not so limited, the pair of security encoder/decoder 217 can operate using an AES encryption/decryption (e.g., algorithm). Once encrypted at the security encoder 217-1, the data that were used to be in plain text form can be in (e.g., converted to) cypher text form. In some embodiments, the security encoder/decoder 217 can be selectively enabled/disabled to transfer data between the memory devices 226 and the memory controller 200 without encrypting/decrypting the data.

The central controller portion 210 further includes an authenticity/integrity check encoder 218-1 to generate authentication data based on data received from the cache 212. Although embodiments are not so limited, the authentication data generated at the authenticity/integrity check encoder 218-1 can be MAC, such as KECCAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity check encoder 218-1 can operate in parallel. For example, the data stored in the cache 212 and that are in plain text form can be input (e.g., transferred) to both the security encoder 217-1 and the authenticity/integrity check encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information (e.g., alternatively referred to as cache line CRC (CL CRC)) based on data received from the security encoder 217-1. The data transferred to the CRC encoder 213-1 from the security encoder 217-1 can be in cypher text form as the data were previously encrypted at the security encoder 217-1. The error detection information generated at the error detection information generator 213-1 can be a check value, such as CRC and/or checksum data. The CRC encoder 213-1 and CRC decoder 213-2 can operate on data (e.g., MTB) having a size equal to or greater than a cache line size.

The central controller portion 210 includes low-power chip kill (LPCK) encoder 214-1 (e.g., paired with an LPCK decoder 214-2) to generate and/or update LPCK parity data (e.g., a PDB) based on data received from the CRC encoder 213-1. The data transferred to the LPCK encoder 214-1 from the CRC encoder 213-1 can be in cypher text form as the data were encrypted at the security encoder 217-1. The LPCK encoder 214-1 can update the PDB (e.g., that were previously generated for an MTB stored in the memory devices 226) to conform to new UDB received as part of a write command from the host. To update the PDB, all of the UDBs of an MTB (to which the new UDB corresponds) can be transferred (e.g., by the memory controller 200) to the LPCK encoder 214-1, which can update (recalculate) the PDB based on comparison (e.g., one or more XOR operations) among the UDBs of the MTB and the new UDB received from the host. In some embodiments, the MTB (including not only the updated PDB and the new UDB, but also the other UDBs that are not "new") can be transferred to the memory devices 226 to be rewritten entirely. In some embodiments, only a portion of the MTB that are subject to changes (e.g., the updated PDB and the new UDB) can be transferred to the memory devices 226 to be written, which eliminates a need to performance of a read-modify-write of the whole MTB to the memory devices 226; thereby, reducing a power associated with writing the updated PDB and the new UDB.

As shown in FIG. 2A, the central controller portion 210 can include ECC encoders 216-1-1, . . . , 216-1-X configured to generate ECC data based on data transferred from the LPCK encoder 214-1. The data transferred to each ECC encoder 216-1 can be in cypher text form as the data were previously encrypted at the security encoder 217-1.

Each ECC encoder 216-1 can be responsible for a respective region of the memory devices 226, such as a memory die, although embodiments are not so limited. As an example, if there are five memory dice in each memory device 226, the memory controller 200 can include five ECC encoders 216-1 (as well as ten ECC decoders 216-2) for each memory device 226 such that ECC data generated at each of the ten ECC encoders 216-1 can be written (e.g., along with user data used to generate the ECC data) to a respective memory die.

Each ECC encoder 216-1 can be paired with a respective one of ECC decoders 216-2-1, . . . , 216-2-X to operate in a collective manner and to be dedicated for each memory device 226 and/or each memory die of the memory devices 226. For example, an ECC encoder 216-1-1 that is responsible for one memory die of the memory device 226-1 can be grouped with an ECC decoder 216-2-1 that is also responsible for the memory die, which allows ECC data that were generated at the ECC encoder 216-1-1 to be later transferred to (e.g., stored in) the ECC decoder 216-2-1 for performing an error correction operation on data (e.g., a portion of MTB) stored in the memory die.

The MTB along with "extra" bits of data (alternatively referred to as "auxiliary data") can be transferred to the back end portion 219 to be ultimately written to the memory devices 226. The "extra" bits can include LPCK parity data generated at the LPCK 214-1 (e.g., in forms of a PDB), error detection information generated at the FCRC encoder 211-1 and/or 213-1, parity data (e.g., symbols) generated at the LPCK encoder 214-1, error correction information generated at the ECC encoders 216-1 (e.g., alternatively referred to as ECC data), and/or authentication data generated at the authenticity/integrity check encoder 218-1 that are associated with the MTB as well as metadata and/or TEE data. As described herein, data corresponding to an MTB can be written to the memory devices in cypher text form.

As shown in FIG. 2A, the memory controller 200 can include a back end portion 219 coupled to the central controller portion 210. The back end portion 219 can include media controllers 221-1, . . . , 221-N. The back end portion 219 can further include PHY memory interfaces 224-1, . . . , 224-N. Each physical interface 224 is configured to be coupled to a respective memory device 226.

The media controllers 221-1, . . . , 221-N can be used substantially simultaneously to drive the channels 225-1, . . . , 225-N simultaneously. In at least one embodiment, each of the media controllers 221 can receive a same command and address and drive the channels 225 substantially simultaneously. By using the same command and address, each of the media controllers 221 can utilize the channels 225 to perform the same memory operation on the same memory cells. As described further below, the channels 225 can include a number of separate data protection channels (alternatively referred to as RAS (Reliability, Availability, and Serviceability) channel), which can each comprise a number of memory devices (e.g., dice) 226 accessed together in association with a particular data protection scheme (e.g., RAID, LPCK, etc.). The data protection channels can include LPCK and/or RAID channels. As used herein, the term "LPCK channel" refers to one or more channels (e.g., channels 125, 225, and/or 325 illustrated in FIGS. 1, 2A, 2B, 3A, and 3B, respectively) that are accessed together for LPCK access. Alternatively speaking, an LPCK channel can be an access unit for transfer of a single LPCK stripe. As used herein, the term "RAID channel" refers to one or more channels (e.g., channels 125, 225, and/or 325 illustrated in FIGS. 1, 2A, 2B, 3A, and 3B, respectively) that are accessed together for RAID access. Alternatively speaking, a RAID channel can be an access unit for transfer of a single RAID stripe. As one example, the channels 225 might comprise four separate data protection channels 225 each comprising ten memory devices 226. Embodiments are not limited to a particular number of channels 225 or to a particular number of memory devices 226 per channel.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The PHY memory interfaces 224 can be an LPDDRx memory interface. In some embodiments, each of the PHY memory interfaces 224 can include data and DMI pins. For example, each PHY memory interface 224 can include four data pins (DQ pins) and one DMI pins. The media control circuitry can be configured to exchange data with a respective memory device 226 via the data pins. The media control circuitry can be configured to exchange error correction information, error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged simultaneously with the error correction information and/or the error detection information. For example, 64 bytes of data (e.g., UDB) can be exchanged (transmitted or received) via the data pins while 64 bits of the extra bits (alternatively referred to as "auxiliary data") are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY layer portion to respective memory devices 226-1, . . . , 226-N. The memory devices 226 each include at least one array of memory cells. In some embodiments, the memory devices 226 can be different types of memory. The media control circuitry can be configured to control at least two different types of memory. For example, the memory devices 226-1 can be LPDDRx memory operated according to a first protocol and the memory device 226-N can be LPDDRx memory operated according to a second protocol different from the first protocol. In such an example, the first media controller 221-1 can be configured to control a first subset of the memory devices 226-1 according to the first protocol and the media controller 221-N can be configured to control a second subset of the memory devices 226-N according to the second protocol.

Data (e.g., an MTB) stored in the memory devices 226 can be transferred to the back end portion 219 to be ultimately transferred and written to the cache 212 and/or transferred to the host (e.g., the host 103 illustrated in FIG. 1). In some embodiments, the MTB is transferred in response to a read command to access the MTB (e.g., transfer the MTB to the host) and/or to synchronize the cache 212 and the memory devices 226 to clean up "dirty" data in the cache 212.

Along with an MTB, other "extra" bits of data (alternatively referred to as "auxiliary data") can be transferred to the back end portion 219 as well. The "extra" bits can include LPCK parity data generated at the LPCK 214-1 (e.g., in forms of a PDB), error detection information generated at the FCRC encoder 211-1 and/or 213-1, parity data (e.g., symbols) generated at the LPCK encoder 214-1, ECC data generated at the ECC encoders 216-1, and authentication data generated at the authenticity/integrity check encoder 218-1 that are associated with the MTB as well as metadata and/or TEE data. As described herein, the MTB transferred to the back end portion 219 can be in cypher text form.

Data transferred to the back end portion 219 can be further transferred to the respective ECC decoders 216-2. At each ECC decoder 216-2, an error correction operation can be performed on a respective subset of the MTB to correct error(s) up to a particular quantity and detect errors beyond particular quantity without correcting those. In one example, each ECC decoder 216-2 can use the error correction information to correct a single error (without detecting errors), which is referred to as a single error correction (SEC) operation. In another example, each ECC decoder 216-2 can use the error correction information to either correct a single error or detect two errors (without correcting two errors), which is referred to as a single error correction and double error detection (SECDED) operation. In a different example, each ECC decoder 216-2 can use the error correction information (e.g., alternatively referred to as ECC data) to either correct a two error or detect three errors (without correcting three errors), which is referred to as a double error correction and triple error detection (DECTED) operation.

As described herein, each ECC decoder 216-2 can also be responsive for a respective region of the memory devices 226 as the ECC encoder 216-1 is. For example, if the ECC decoder 216-2-1 is responsible for one memory die of the memory device 226-1, the ECC data and a subset of the MTB stored in that memory die can be transferred to the ECC decoder 216-2-1. Therefore, each subset of the MTB can be individually corrected for any errors at respective ECC decoders 216-2. In some embodiments, pairs of ECC encoder/decoder 216 can be selectively enabled/disabled to transfer data between the memory devices 226 and the memory controller 200 without generating error correction information and/or performing an error correction operation using the pairs.

Subsequent to error correction operations performed respectively at the ECC decoders 216-2, the MTB can be further transferred to the LPCK decoder 214-2 along with a corresponding PDB (previously generated at the LPCK encoder 214-1). At the LPCK decoder 214-2, the LPCK parity data can be used to perform a chip kill operation (e.g., an LPCK operation) on the MTB received from the memory devices 226. The LPCK protection against any single memory device 226 (chip) failure and/or multi-bit error from any portion of a single memory chip can be implemented collectively across subsets of the memory devices 226 (e.g., LPCK can be provided for a first subset of the memory devices 226-1 and separately for a second subset of the memory devices 226-N) or across all of the memory devices 226.

An example chip kill implementation for a memory controller 200 can include writing an MTB with two UDBs to eight memory dice of the memory devices 226 and PDB to one or two memory dice of the memory devices 226. Eight codewords can be written, each composed of eight four-bit symbols, with each symbol belonging to a different memory die of the memory devices 226. A first codeword can comprise the first four-bit symbol of each memory die, a second codeword can comprise the second four-bit symbol of each memory die, a third codeword can comprise the third four-bit symbol of each memory die, a fourth codeword can comprise the fourth four-bit symbol of each memory die, a fifth codeword can comprise the fifth four-bit symbol of each memory die, a sixth codeword can comprise the sixth four-bit symbol of each memory die, a seventh codeword can comprise the seventh four-bit symbol of each memory die, and a eighth codeword can comprise the eighth four-bit symbol of each memory die. The two parity symbols can allow the LPCK circuitry 214 to correct up to one symbol error in each codeword and to detect up to two symbol errors.

In some embodiments, the data symbols and the parity symbols can be written or read simultaneously from the memory devices 226. If every bit symbol in a memory device 226 fails, only the bit symbols from that memory device 226 in the codeword will fail. This allows memory contents to be reconstructed despite the complete failure of one memory device 226. LPCK is considered to be "on-the-fly correction" because the data is corrected without impacting performance by performing a repair operation (e.g., chip kill operation). For example, the PDB is transferred to the memory controller 200 from the memory devices 226 along with the MTB, which eliminates a need to separately transfer the PDB when a chip kill operation is needed, which, therefore, does not impact performance in performing the chip kill operation. The LPCK encoder 214-1 and/or the decoder 214-2 can include combinational logic that uses a feedforward process.

Subsequent to an LPCK operation performed at the LPCK decoder 214-2, the MTB can be further transferred to the CRC decoder 213-2 along with at least the error detection information previously generated at the CRC encoder 213-1. At the CRC decoder 213-2, an error detection operation can be performed to detect any errors in the MTB using the error detection information, such as CRC data.

Subsequent to an error detection operation performed at the CRC decoder 213-2, the MTB can be further transferred to the security decoder 217-2 and the authenticity/integrity check decoder 218-2 along with at least the authentication data previously generated at the authenticity/integrity check encoder 218-1. At the security decoder 217-2, the data (e.g., MTB) can be decrypted (e.g., converted from the cypher text back to the plain text as originally received from the host). The security decoder 217-2 can use an AES decryption to decrypt the data.

The data that were decrypted at the security decoder 217-2 can be input (in plain text form) to the authenticity/integrity check decoder 218-2, at which the data can be authenticated using the authentication data (e.g., MAC) that were previously generated at the authenticity/integrity check encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., MTB) authenticated at the authenticity/integrity check decoder 218-2 and decrypted at the security decoder 217-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, read and write commands of CXL memory systems can be a size of UDB, such as 64 bytes. For example, data can be requested by the host in a granularity of an UDB instead of an MTB. In this example, even if data transferred from the memory devices 226 are in a granularity of an MTB, data can be transferred from the cache 212 to the host in a granularity of an UDB. At the FCRC decoder 211-2, data (e.g., UDB) can be checked for any errors using CRC data that were previously generated at the FCRC encoder 211-1. The data decrypted at the FCRC decoder 211-2 can be further transferred to the host.

Figure 2B:
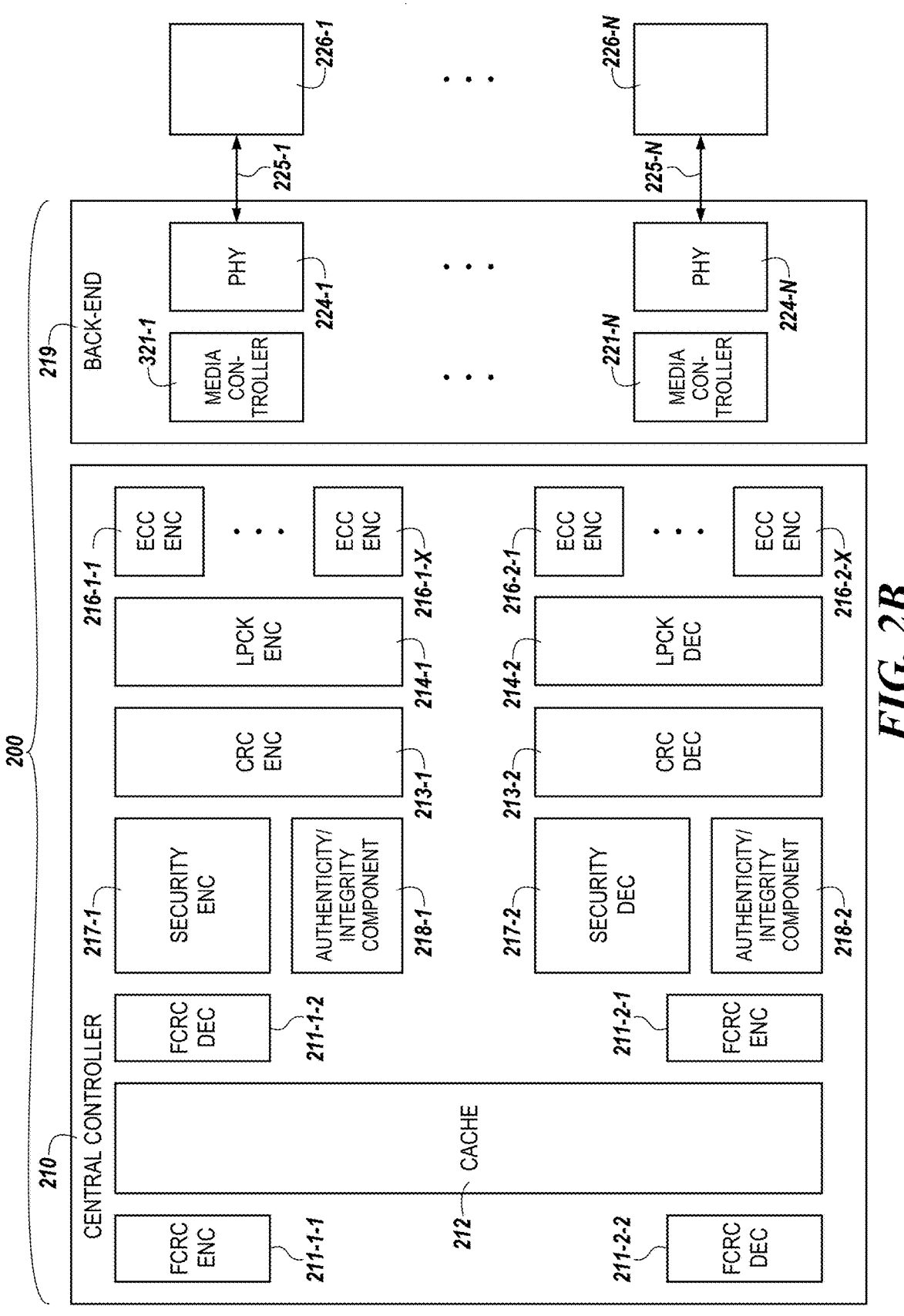
FIG. 2B is another functional block diagram of a memory controller having a LPCK encoder/decoder in accordance with a number of embodiments of the present disclosure.

FIG. 2B is a functional block diagram of a memory controller 200 having an authenticity/integrity component (e.g., an authenticity/integrity check encoder/decoder 218-1/218-2 that are respectively shown as "AUTHENTICITY/INTEGRITY ENC" 218-1 and "AUTHENTICITY/INTEGRITY DEC" 218-2 in FIG. 2B) and pairs of front-end CRC (alternatively referred to and shown as "FCRC" in FIG. 2B) encoder/decoder 211-1 and 211-2 in another configuration in accordance with a number of embodiments of the present disclosure. The memory controller 200, the back end portion 219, and the memory devices 226 illustrated in FIG. 2B are analogous to the memory controller 100, the back end portion 119, and the memory devices 126 illustrated in FIG. 1.

The memory controller 200 can include a central controller portion 210, and a back end portion 219. The central controller portion 210 can include a FCRC encoder 211-1-1 paired with a FCRC decoder 211-1-2 and a FCRC encoder 211-2-1 paired with a FCRC decoder 211-2-2, the cache memory 212 coupled between the paired FCRC encoder/decoder 211-1 and FCRC encoder/decoder 211-2, the security encoder 217-1 paired with the security decoder 217-2, the authenticity/integrity check encoder 218-1 paired with the authenticity/integrity check decoder 218-2, the CRC encoder 213-1 paired with the CRC decoder 213-2, the LPCK encoder 214-1 paired with the LPCK decoder 214-2, and the ECC encoders 216-1-1, . . . , 216-1-X respectively paired with the ECC decoders 216-2-1, . . . , 216-2-X. A pair of security encoder/decoder 217, a pair of authenticity/integrity check encoder/decoder 218, a pair of CRC encoder/decoder 213, a pair of LPCK 214, respective pairs of ECC encoder/decoder 216 can be analogous to a pair of security encoder/decoder 217, a pair of authenticity/integrity check encoder/decoder 218, a pair of CRC encoder/decoder 213, a pair of LPCK 214, respective pairs of ECC encoder/decoder 216, as illustrated in FIG. 2A. The back end portion 219 can include media controllers 221-1, . . . , 221-N and PHY memory interfaces 224-1, . . . , 224-N configured to be coupled to memory devices 226-1, . . . , 226-N via channels 225-1, . . . , 225-N.

FIG. 2B is analogous to FIG. 2A, except that it includes additional circuitry to check any errors on the UDB using CRC data without transferring/storing the CRC to the memory device 226. For example, as illustrated in FIG. 2B, the FCRC decoder 211-1-2 coupled between the cache 212 and the security encoder 217-1 (and/or the authenticity/integrity check encoder 218-1) can be configured to check any errors on an UDB stored in the cache 212 using error detection information (e.g., CRC data) generated at the FCRC encoder 211-1-1. Further, the FCRC encoder 211-2-1 coupled between the cache 212 and the security decoder 217-2 (and/or the authenticity/integrity check decoder 218-2) can be configured generate error detection information (e.g., CRC data) on an UDB to be transferred to the host (e.g., the host 103 illustrated in FIG. 1). The error detection information generated at the FCRC encoder 211-2-1 can be used at the FCRC decoder 211-2-2 to check any errors on an UDB transferred from the cache 212.

In some embodiments, the pairs of FCRC encoder/decoder 211-1 and 211-2 can be used just to check errors on data stored in the cache. Accordingly, error detection information used at the pairs of FCRC encoder/decoder 211-1 and 211-2 may not be transferred and written to the memory devices 226.

Figure 3A:
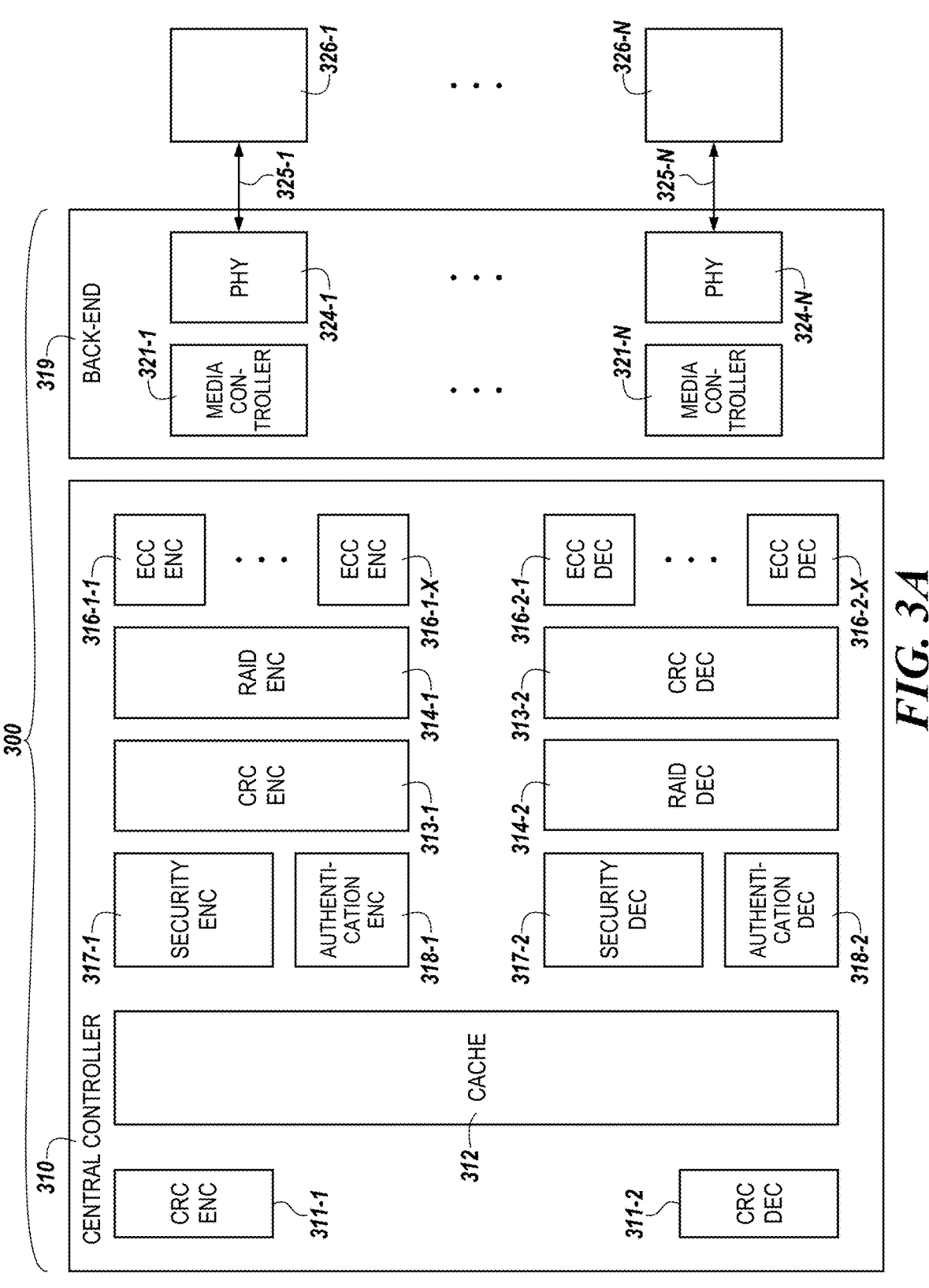
FIG. 3A is a functional block diagram of a memory controller having a low-power chip kill (LPCK) encoder/decoder in accordance with a number of embodiments of the present disclosure.

FIG. 3A is a functional block diagram of a memory controller 300 for cache line data protection in accordance with a number of embodiments of the present disclosure. The memory controller 300, the central controller portion 310, the back end portion 319, and the memory devices 326 illustrated in FIG. 3A are analogous to the memory controller 100, the central controller portion 310, the back end portion 119, and the memory devices 126 illustrated in FIG. 1.

The central controller portion 310 includes a front-end CRC ("FCRC") encoder 311-1 (e.g., paired with a FCRC decoder 311-2) to generate error detection information (e.g., alternatively referred to as end-to-end CRC (e2e CRC)) based on data (e.g., an UDB in "plain text" form) received as a part of a write command (e.g., received from the host 103) and before writing the data to the cache 312. The error detection information generated at the FCRC encoder 311-1 can be a check value, such as CRC data. Read and write commands of CXL memory systems can be a size of UDB, such as 64 bytes. Accordingly, the data received at the FCRC encoder 311-1 can correspond to an UDB.

The central controller portion 310 includes a cache 312 to store data (e.g., user data), error detection information, error correction information, and/or metadata associated with performance of the memory operation. An example of the cache 312 is a thirty-two (32) way set-associative cache including multiple cache lines. While host read and write commands can be a size of an UDB (e.g., 64 bytes), the cache line size can be greater than a size of an UDB (e.g., equal to a size of multiple UDBs). For example, the cache line size can correspond to a size of 2 UDBs (with each UDB being a 64-byte chunk), such as 128 bytes.

These UDBs stored in each cache line (e.g., alternatively referred to as "UDBs corresponding to a cache line") can be a data transfer unit of data paths between the cache 312 and the memory devices 326. For example, even though a host read/write command is a size of an UDB, such as 64 bytes, the UDBs corresponding to a cache line can be collectively transferred between the cache 312 and the memory devices 326 (e.g., through other encoder/decoder illustrated in FIG. 3A) as a chunk. Therefore, the UDBs corresponding to a cache line can be collectively encrypted/decrypted at various encoder/decoders illustrated in FIG. 3A and located between the cache 312 and the memory devices 326. In some embodiments, these UDBs corresponding to a same cache line can form an MTB.

Data (e.g., UDBs) stored in (e.g., a respective cache line of) the cache 312 can be further transferred to the other components (e.g., a security encoder 317-1 and/or an authenticity/integrity check encoder 318-1, which is shown as "AUTHENTICITY/INTEGRITY ENC" 318-1) of the central controller portion 310 (e.g., as part of cache writing policies, such as cache writeback and/or cache writethrough) to be ultimately stored in the memory devices 326 to synchronizes the cache 312 and the memory devices 326 in the event that the data received from the host (e.g., the host 103 illustrated in FIG. 1) have not been written to the memory devices 326 yet.

Use of the cache 312 to store data associated with a read operation or a write operation can increase a speed and/or efficiency of accessing the data because the cache 312 can prefetch the data and store the data in multiple 64-byte blocks in the case of a cache miss. Instead of searching a separate memory device in the event of a cache miss, the data can be read from the cache 312. Less time and energy may be used accessing the prefetched data than would be used if the memory system has to search for the data before accessing the data.

The central controller portion 310 further includes a security encoder 317-1 (e.g., paired with a security decoder 317-2) to encrypt data (e.g., UDBs corresponding to a cache line) before transferring the data to a CRC encoder 313-1 (to write the data to the memory devices 326). Although embodiments are not so limited, the pair of security encoder/decoder 317 can operate using an AES encryption/decryption (e.g., algorithm). Unencrypted data (e.g., plain text) can be converted to cypher text via encryption by the security encoder 317-1. The central controller portion 310 further includes an authenticity/integrity check encoder 318-1 to generate authentication data based on data received from the cache 312. Although embodiments are not so limited, the authentication data generated at the authenticity/integrity check encoder 318-1 can be MAC, such as KECCAK MAC (KMAC) (e.g., SHA-3-356 MAC).

In some embodiments, the MAC generated at the authenticity/integrity check encoder 318-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 326) to be accessed for executing a host write command.

The security encoder 317-1 and the authenticity/integrity check encoder 318-1 can operate in parallel. For example, the data stored in the cache 312 and that are in plain text form can be input (e.g., transferred) to both the security encoder 317-1 and the authenticity/integrity check encoder 318-1. In some embodiments, a security key ID can be further input (along with the data in plain text form) to the security encoder 317-1. Further, in some embodiments, a security key ID, TEE flag, and an HPA associated with a host write command can be further input (along with the data in plain text form) to the authenticity/integrity check encoder 318-1.

The central controller portion 310 includes a CRC encoder 313-1 (e.g., paired with a CRC decoder 313-2) to generate error detection information (e.g., alternatively referred to as CRC media (CRCm)) based collectively on UDBs corresponding to a cache line received from the security encoder 317-1. The data transferred to the CRC encoder 313-1 from the security encoder 317-1 can be in cypher text form as the data were previously encrypted at the security encoder 317-1. The error detection information generated at the error detection information generator 313-1 can be a check value, such as CRC data. The CRC encoder 313-1 and CRC decoder 313-2 can operate on data having a size equal to or greater than a cache line size.

The central controller portion 310 includes RAID encoder 314-1 (e.g., paired with a RAID decoder 314-2) to generate and/or update RAID parity data (e.g., a PDB) based at least in part on data (e.g., one or more UDBs corresponding to a cache line) received from the CRC encoder 313-1. The data transferred to the RAID encoder 314-1 from the CRC encoder 313-1 can be in cypher text form as the data were encrypted at the security encoder 317-1.

The RAID encoder 314-1 can update the PDB to conform to new UDB received as part of a write command from the host. To update the PDB, an old UDB (that is to be replaced with the new UDB) and an old PDB (of a same stripe as the old UDB) can be read (e.g., transferred to the RAID encoder 314-1) and compared (e.g., XORed) with the new UDB, and a result of the comparison (e.g., the XOR operation) can be further compared (e.g., XORed) with an old PDB (that is to be updated) to result in a new (e.g., updated) PDB.

As shown in FIG. 3A, the central controller portion 310 can include ECC encoders 316-1-1, . . . , 316-1-X. Each ECC encoder 316-1 can be configured to generate ECC data (alternatively referred to as "error correction information") based collectively on data (e.g., UDBs corresponding to a cache line) transferred from the RAID encoder 314-1. The data transferred to each ECC encoder 316-1 can be in cypher text form as the data were previously encrypted at the security encoder 317-1.

Each ECC encoder 316-1 can be responsible for a respective region of the memory devices 326, such as a memory die, although embodiments are not so limited. As an example, if there are five memory dice in each memory device 326, the memory controller 300 can include five ECC encoders 316-1 (as well as ten ECC decoders 316-2) for each memory device 326 such that ECC data generated at each of the ten ECC encoders 316-1 can be written (e.g., along with user data used to generate the ECC data) to a respective memory die.

Each ECC encoder 316-1 can be paired with a respective one of ECC decoders 316-2-1, . . . , 316-2-X to operate in a collective manner and to be dedicated for each memory device 326 and/or each memory die of the memory devices 326. For example, an ECC encoder 316-1-1 that is responsible for one memory die of the memory device 326-1 can be grouped with an ECC decoder 316-2-1 that is also responsible for the memory die, which allows ECC data that were generated at the ECC encoder 316-1-1 to be later transferred to (e.g., stored in) the ECC decoder 316-2-1 for performing an error correction operation on data (e.g., a portion of MTB) stored in the memory die.

"Extra" bits of data (alternatively referred to as "auxiliary data") can be transferred (along with the UDBs) to the back end portion 319 to be ultimately transferred and written to the memory devices 326. The "extra" bits can include RAID parity data (e.g., in forms of a PDB) generated at the RAID 314-1, error detection information (e.g., CRC data) generated at the FCRC encoder 311-1 and/or 313-1, error correction information (e.g., alternatively referred to as ECC data) generated at the ECC encoders 316-1, and/or authentication data (e.g., MAC data) generated at the authenticity/integrity check encoder 318-1 that are associated with the UDBs as well as metadata and/or TEE data.

As shown in FIG. 3A, the memory controller 300 can include a back end portion 319 coupled to the central controller portion 310. The back end portion 319 can include media controllers 321-1, . . . , 321-N. The back end portion 319 can include PHY memory interfaces 324-1, . . . , 324-N. Each physical interface 324 is configured to be coupled to a respective memory device 326.

The media controllers 321-1, . . . , 321-N can be used substantially simultaneously to drive the channels 325-1, . . . , 325-N simultaneously. In at least one embodiment, each of the media controllers 321 can receive a same command and address and drive the channels 325 substantially simultaneously. By using the same command and address, each of the media controllers 321 can utilize the channels 325 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The PHY memory interfaces 324 can be an LPDDRx memory interface. In some embodiments, each of the PHY memory interfaces 324 can include data and DMI pins. For example, each PHY memory interface 324 can include twenty data pins (DQ pins) and five DMI pins. The media controllers 321 can be configured to exchange data with a respective memory device 326 via the data pins. The media controllers 321 can be configured to exchange error correction information (e.g., ECC data), error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged simultaneously with the error correction information and/or the error detection information. For example, 128 bytes of data (e.g., UDBs corresponding to a cache line) can be exchanged (transmitted or received) via the data pins while 128 bits of the extra bits are exchanged via the DMI pins. Such embodiments reduce what would otherwise be overhead on the data input/output (e.g., also referred to in the art as a "DQ") bus for transferring error correction information, error detection information, and/or metadata.

The back end portion 319 can couple the PHY memory interfaces 324-1, . . . , 324-N to respective memory devices 326-1, . . . , 326-N. The memory devices 326 each include at least one array of memory cells. In some embodiments, the memory devices 326 can be different types of memory. The media controllers 321 can be configured to control at least two different types of memory. For example, the memory device 326-1 can be LPDDRx memory operated according to a first protocol and the memory device 326-N can be LPDDRx memory operated according to a second protocol different from the first protocol. In such an example, the first media controller 321-1 can be configured to control a first subset of the memory devices 326-1 according to the first protocol and the second media controller 321-N can be configured to control a second subset of the memory devices 326-N according to the second protocol.

Data (UDBs corresponding to a cache line) stored in the memory devices 326 can be transferred to the back end portion 319 to be ultimately transferred and written to the cache 312 and/or transferred to the host (e.g., the host 103 illustrated in FIG. 1). In some embodiments, the data are transferred in response to a read command to access a subset of the data (e.g., one UDB) and/or to synchronize the cache 312 and the memory devices 326 to clean up "dirty" data in the cache 312.

Along with the UDBs, other "extra" bits of data (alternatively referred to as "auxiliary data") can be transferred to the back end portion 319 as well. The "extra" bits can include RAID parity data generated at the RAID encoder 314-1 (e.g., in forms of a PDB), error detection information generated at the FCRC encoder 311-1 and/or 313-1, parity data (e.g., symbols) generated at the RAID encoder 314-1, ECC data generated at the ECC encoders 316-1, and authentication data generated at the authenticity/integrity check encoder 318-1 that are associated with the UDBs as well as metadata and/or TEE data. As described herein, the UDBs transferred to the back end portion 319 can be in cypher text form.

Data (e.g., UDBs corresponding to a cache line) transferred to the back end portion 319 can be further transferred to the respective ECC decoders 316-2. At each ECC decoder 316-2, an error correction operation can be performed on the data to correct error(s) up to a particular quantity and detect errors beyond particular quantity without correcting those. In one example, each ECC decoder 316-2 can use the error correction information (e.g., ECC data) to either correct a single error or detect two errors (without correcting two errors), which is referred to as a single error correction and double error detection (SECDED) operation. In another example, each ECC decoder 316-2 can use the error correction information to either correct a two error or detect three errors (without correcting three errors), which is referred to as a double error correction and triple error detection (DECTED) operation.

As described herein, each ECC decoder 316-2 can also be responsible for a respective memory device 326 as the paired ECC encoder 316-1 is. For example, if the ECC decoder 316-2-1 is responsible for the memory device 326-1, the ECC data and the UDBs stored in the memory device 326-1 can be transferred to the ECC decoder 316-2-1. In some embodiments, pairs of ECC encoder/decoder 316 can be selectively enabled/disabled to transfer data between the memory devices 326 and the memory controller 300 without generating error correction information (e.g., ECC data) and/or performing an error correction operation using the pairs.

Subsequent to error correction operations performed respectively at the ECC decoders 316-2, the UDBs can be further transferred to the CRC decoder 313-2 along with at least the error detection information previously generated at the CRC encoder 313-1. At the CRC decoder 313-2, an error detection operation can be performed to detect any errors in the UDBs using the error detection information, such as CRC data.

The CRC decoder 313-2 can operate on data in conjunction with the RAID decoder 314-2 to provide check-and-recover correction. More specifically, the CRC decoder 313-2 can detect an error in data (e.g., received from the respective ECC decoder 316-2) and the RAID decoder 314-2 can recover the data in response. In at least one embodiment, the check-and-recover correction provided by the error detection circuitry 211 and the RAID decoder 314-2 is supplemental to the error correction provided by the ECC decoder 316-2. For example, if data (e.g., UDBs corresponding to a cache line) transferred from the memory devices 226 has an error correctable by the ECC decoder 316-2, it can do so without further data recovery (e.g., one or more RAID operations) by the RAID decoder 314-2. However, if an error persists that is not correctable by the ECC decoder 316-2, then the data may be recoverable by the RAID decoder 314-2. As another example, an error may escape detection by the ECC decoder 316-2, but be detected by the CRC decoder 313-2. In such an example, the underlying data may be recoverable by the RAID decoder 314-2.

When the RAID process is triggered, the RAID operation performed on the UDB can recover a subset of the UDB that was transferred from one (e.g., failed) memory die based on the other subsets of the UDB transferred from the other memory dice. Since all the subsets (of the UDB) is collectively input (e.g., transferred) to the CRC decoder (e.g., the CRC decoder 313-2 illustrated in FIG. 3A) and collectively checked for one or more errors (alternatively referred to as "locked-RAID"), the CRC check performed at the CRC decoder may not indicate which subset has one or more errors. Therefore, the triggered RAID process involves a number of RAID operations that can be respectively and independently performed on each subset to correct the one subset that indeed has the errors. For example, considering an UDB is received from eight memory dice (e.g., the memory dice 527-1 to 527-8 illustrated in FIG. 5A), eight RAID operations can be performed (e.g., in parallel) respectively on each subset (corresponding to each memory dice) of the UDB.

In some embodiments, the RAID decoder 314-2 can further include a CRC decoder that provides the same functionality as the CRC decoder 213-2, but to perform an error detection operation (e.g., to CRC-check) on data subsequent to the RAID operations. Continuing with the above example, the CRC check can be performed using the CRC decoder within the RAID decoder 314-2 on results of the eight RAID operations to determine which one of the RAID operations actually corrected the errors. One of the results (e.g., UDB with the errors corrected properly) can be further sent to the security decoder 317 and/or authentication decoder 318.

The data (e.g., UDBs corresponding to a cache line) can be further transferred to the security decoder 317-2 and to the authenticity/integrity check decoder 318-2 (shown as "AUTHENTICITY/INTEGRITY DEC" 318-2 in FIG. 3A) along with at least the authentication data previously generated at the authenticity/integrity check encoder 318-1. At the security decoder 317-2, the data can be decrypted (e.g., converted from the cypher text back to the plain text as originally received from the host). The security decoder 317-2 can use an AES decryption to decrypt the data.

At the authenticity/integrity check decoder 318-2, the data that were decrypted at the security decoder 317-2 can be authenticated (and/or checked for data integrity) using the authentication data (e.g., MAC data) that were previously generated at the authenticity/integrity check encoder 318-1. In some embodiments, the authenticity/integrity check decoder 318-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 326. If the calculated MAC and transferred MAC match, the UDB is written to the cache 312 (and further transferred to the host if needed). If the calculated MAC and transferred MAC do not match, the host is notified of the mismatch (and/or the poison).

The data (e.g., UDBs corresponding to a cache line) authenticated (and/or checked for data integrity) at the authenticity/integrity check decoder 318-2 can be transferred and written to the cache 312. In some embodiments, data can be further transferred from the cache 312 to the FCRC decoder 311-2, for example, in response to a read command received from the host (e.g., the host 103 illustrated in FIG. 1). As described herein, host read and write commands of CXL memory systems can be a size of UDB, such as 64 bytes. For example, data can be requested by the host in a granularity of an UDB. In this example, even if data transferred from the memory devices 326 are multiple UDBs (corresponding to a cache line), data can be transferred from the cache 312 to the host in a granularity of an UDB. At the FCRC decoder 311-2, data (e.g., an UDB requested by the host) can be checked (CRC-checked) for any errors using CRC data that were previously generated at the FCRC encoder 311-1. The data decrypted at the FCRC decoder 311-2 can be further transferred to the host.

Figure 3B:
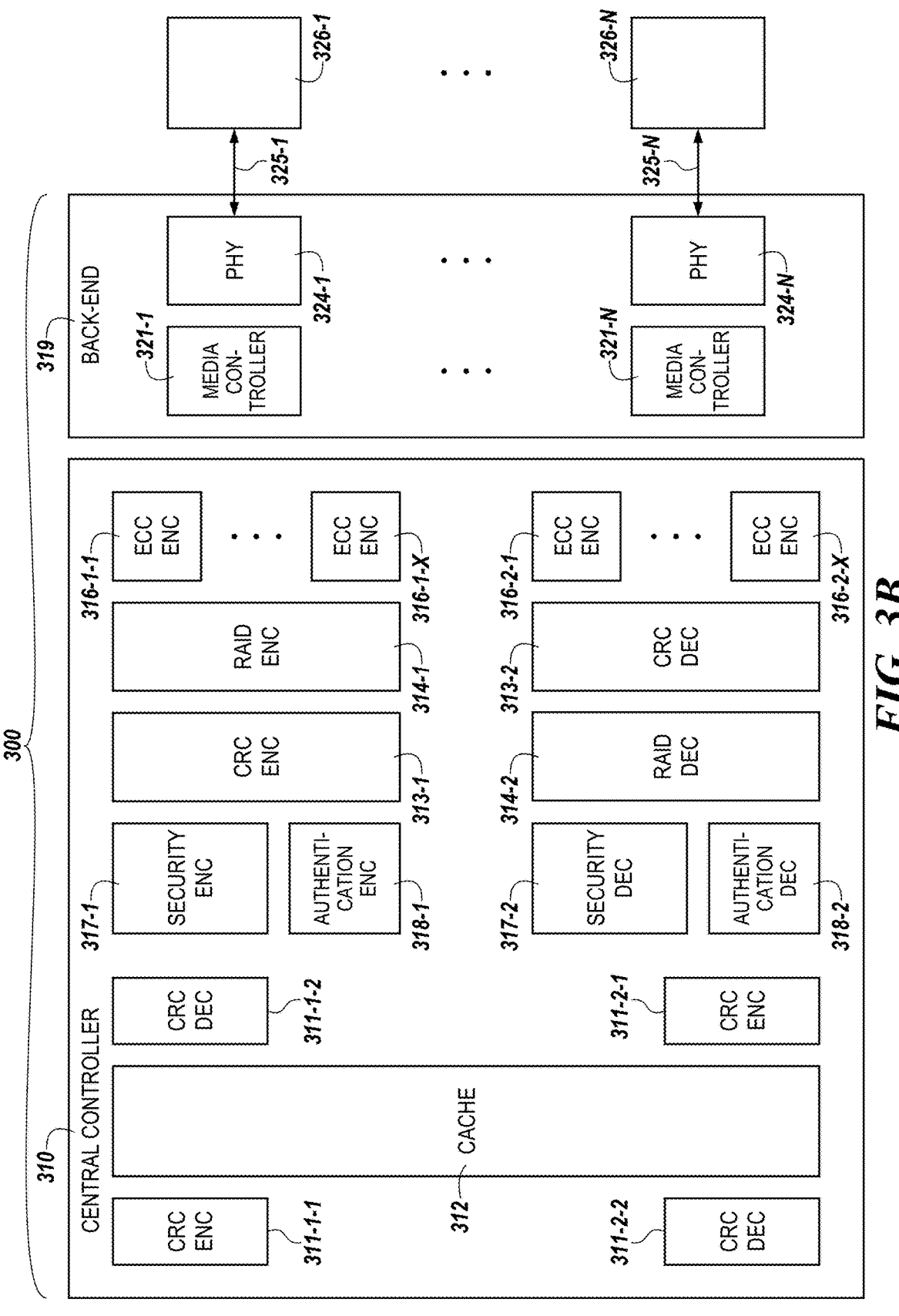
FIG. 3B is a functional block diagram of a memory controller having a redundant array of independent disks (RAID) encoder/decoder in accordance with a number of embodiments of the present disclosure.

FIG. 3B is another functional block diagram of a memory controller 300 for cache line data protection in accordance with a number of embodiments of the present disclosure. The memory controller 300, the central controller portion 310, the back end portion 319, and the memory devices 326 illustrated in FIG. 3B are analogous to the memory controller 100, the central controller portion 110, the back end portion 119, and the memory devices 126 illustrated in FIG. 1.

The memory controller 300 can include a central controller portion 310, and a back end portion 319. The central controller portion 310 can include a front-end CRC ("FCRC") encoder 311-1-1 paired with a FCRC decoder 311-2 and a FCRC encoder 311-2-1 paired with a FCRC decoder 311-2-1, the cache memory 312 coupled between the paired CRC encoder/decoder 311-1 and CRC encoder/decoder 311-2, the security encoder 317-1 paired with the security decoder 317-2, the authenticity/integrity check encoder 318-1 (shown as "AUTHENTICITY/INTEGRITY ENC" 318-1 in FIG. 3B) paired with the authenticity/integrity check decoder 318-2 (shown as "AUTHENTIC-ITY/INTEGRITY DEC" 318-2 in FIG. 3B), the CRC encoder 313-1 paired with the CRC decoder 313-2, the RAID encoder 314-1 paired with the RAID decoder 314-2, and the ECC encoders 316-1-1, . . . , 316-1-X respectively paired with the ECC decoders 316-2-1, . . . , 316-2-X. A pair of security encoder/decoder 317, a pair of authenticity/integrity check encoder/decoder 318, a pair of CRC encoder/decoder 313, a pair of RAID 314, respective pairs of ECC encoder/decoder 316 can be analogous to a pair of security encoder/decoder 317, a pair of authenticity/integrity check encoder/decoder 318, a pair of CRC encoder/decoder 313, a pair of RAID 314, respective pairs of ECC encoder/decoder 316, as illustrated in FIG. 3A. Although not illustrated in FIG. 3B, the RAID decoder 314-2 can further include a CRC decoder that provides the same functionality as the CRC decoder 313-2, but to perform an error detection operation (e.g., to CRC-check) on data subsequent to the RAID process.

The back end portion 319 can include media controllers 321-1, . . . , 321-N. The PHY layer 322 can include PHY memory interfaces 324-1, . . . , 324-N configured to be coupled to memory devices 326-1, . . . , 326-N via channels 325-1, . . . , 325-N.

FIG. 3B is analogous to FIG. 3A, except that it includes additional circuitry to check any errors on the UDB using CRC data without transferring/storing the CRC to the memory device 326. For example, as illustrated in FIG. 3B, the FCRC decoder 311-1-2 coupled between the cache 312 and the security encoder 317-1 (and/or the authenticity/integrity check encoder 318-1) can be configured to check any errors on an UDB stored in the cache 312 using error detection information (e.g., CRC data) generated at the FCRC encoder 311-1-1. The FCRC encoder 311-2-1 coupled between the cache 312 and the security decoder 317-2 (and/or the authenticity/integrity check decoder 318-2) can be configured generate error detection information (e.g., CRC data) on an UDB to be transferred to the host (e.g., the host 103 illustrated in FIG. 1). The error detection information generated at the FCRC encoder 311-2-1 can be used at the FCRC decoder 311-2-2 to check any errors on an UDB transferred from the cache 312.

In some embodiments, the pairs of CRC encoder/decoder 311-1 and 311-2 can be used just to check errors on data stored in the cache. Accordingly, error detection information (e.g., CRC data) used at the pairs 311-1 and 311-2 may not be transferred and written to the memory devices 336.

Figure 4A:
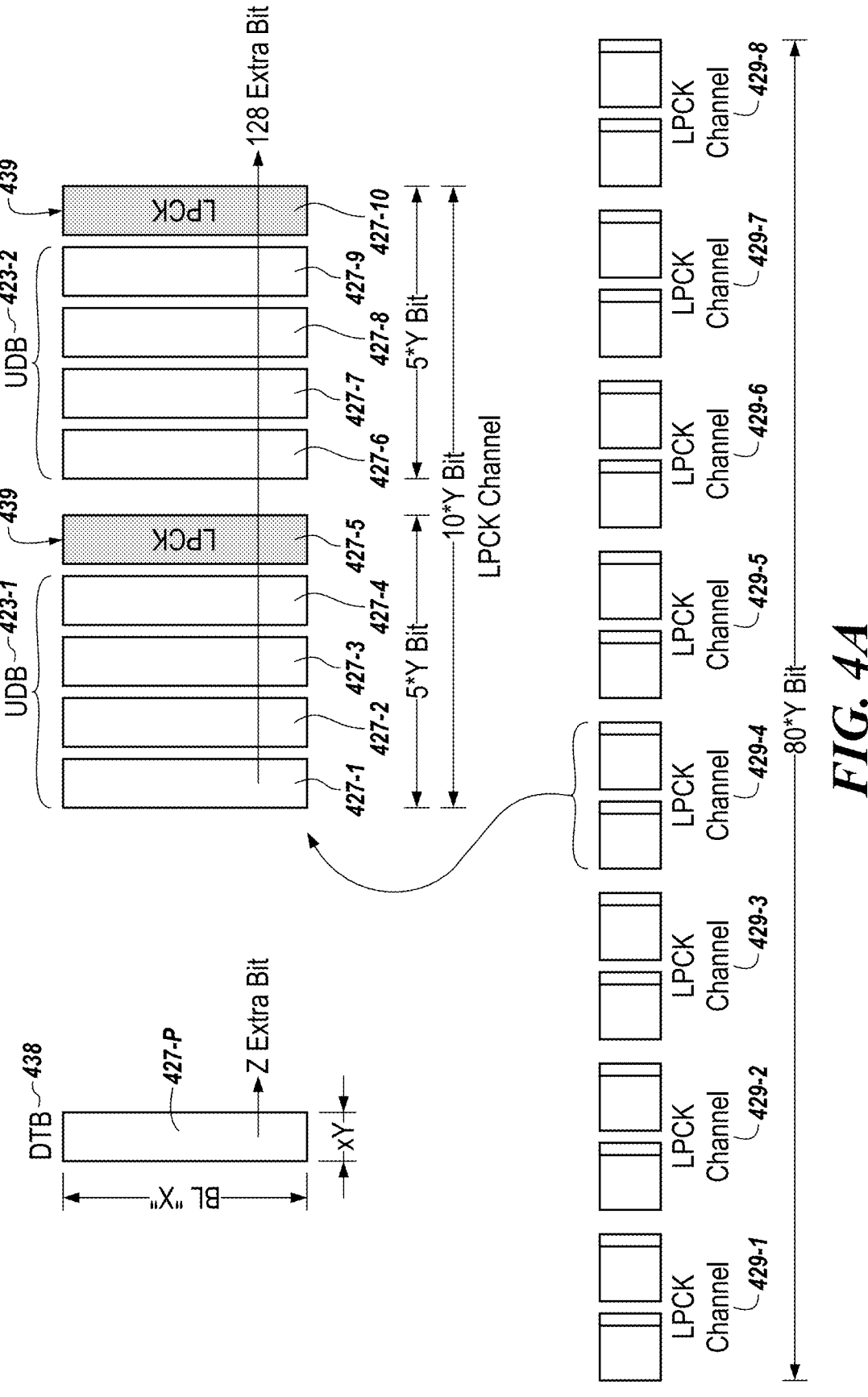
FIG. 4A is a block diagram of memory dice corresponding to one or more data protection (LPCK) channels in accordance with a number of embodiments of the present disclosure.

FIG. 4A is a block diagram of memory dice corresponding to a number of data protection (LPCK) channels in accordance with a number of embodiments of the present disclosure. An example memory die 427-P (which can be analogous to one or more memory dice illustrated in FIG. 4A) can be configured to store a die transfer block 438 ("DTB" as shown in FIG. 4A), which can be transferred to or from the memory die (e.g., to the memory controller 100, 200, and/or 300 illustrated in FIGS. 1-3, respectively) over a predefined burst length. For example, a DTB 438 can be transferred over X-bit burst length with Y-bit data transfer (e.g., via Y number of DQ pins) for each beat of the X-bit burst length (that amounts to Y*X bits of user data), which also transfers a total of Z-bit of auxiliary data (e.g., via Z number of DMI pins). More particularly, over 32-bit burst length, 16 bytes of user data (e.g., a portion of the UDB 423) can be transferred from the memory die 427-P via 32 4-bit data transfers (alternatively referred to as "x4 mode") and 16 bits of auxiliary data can be transferred via 16 1-bit data transfers.

The diagram shows eight memory dice 427-1, . . . , 427-4 and 427-6, . . . , 427-8 (of LPCK channel 429-5) over which UDBs 423-1 and 423-2 can be stored, although embodiments are not limited to a particular quantity of memory dice over which a single UDB can be stored. For example, the UDB 432-1 can be stored over the memory dice 427-1, 427-2, 427-3, and 427-4, while the UDB 432-1 can be stored over the memory dice 427-6, 427-7, 427-8, and 427-9. The UDB 432-1 and 432-2 can form an MTB, which further corresponds to a cache line of the cache 212 and/or 312 illustrated in FIGS. 2 and 3, respectively. The diagram further shows two memory dice 427-5 and 427-10 over which a PDB 439 including LPCK parity data can be stored, although embodiments are not limited to a particular quantity of memory dice over which a PDB can be stored.

Although embodiments are not so limited, five memory dice 427 can correspond to (e.g., a channel width of) the channel 125, 225, and/or 325 illustrated in FIGS. 1 and 2, respectively. For example, memory dice 427-1, . . . , 427-5 can correspond to one channel 125, 225, 335 while memory dice 427-6, . . . , 427-10 can correspond to a different channel 125, 225, 335. Accordingly, each channel 125, 225, 325 can be 5*Y-bit wide (e.g., 20-bit wide).

20-bit wide channels 125, 225, 325 (that x8 mode memory dice are not capable of providing) can provide benefits over 16-bit wide channels 125, 225, 325 (that x8 mode are capable of providing) in association with operation of the CXL memory system. For example, at a cache hit rate of 20%, 40%, and 60% (with 70% of host commands being read commands and a dirty cache miss rate of 30%), the 20-bit wide channel 125, 225, 325 can provide a bandwidth (e.g., between the front end portion 104 and the host 103) of roughly 40 gigabytes per second (GB/s), 50 GB/s, and 75 GB/s, while the 16-bit wide channel 125, 225, 325 is limited to a bandwidth of roughly 18 GB/s, 20 GB/s, and 30 GB/s, respectively.

In an example illustrated in FIG. 4A, eight memory dice (configured for UDBs 423-1 and 423-2) along with two memory dice (configured for a PDB 439) can be collectively referred to as an LPCK channel. Accordingly, 10*Y bits (e.g., 40 bits) can be transferred for each beat of the X-bit burst length. These ten memory dice 427-1, . . . , 427-10 can be accessed simultaneously (e.g., substantially simultaneously as defined herein).

The computing system (e.g., the computing system 101 illustrated in FIG. 1) can include a number of LPCK channels, such as eight LPCK channels 429-1, . . . , 429-8 (which can transfer 80*Y bits, such as 320 bits, for each beat of the X-bit burst length) as illustrated in FIG. 4A, although embodiments are not limited to a particular quantity of LPCK channels the computing system can include. Each LPCK channel 429 can be a unit of LPCK access. For example, each UDB respectively stored in the respective LPCK channel 429 can be restored by the LPCK operation that uses data (e.g., PDB) stored in one or more memory dice of (e.g., corresponding to) the same LPCK channel 429.

Figure 4B:
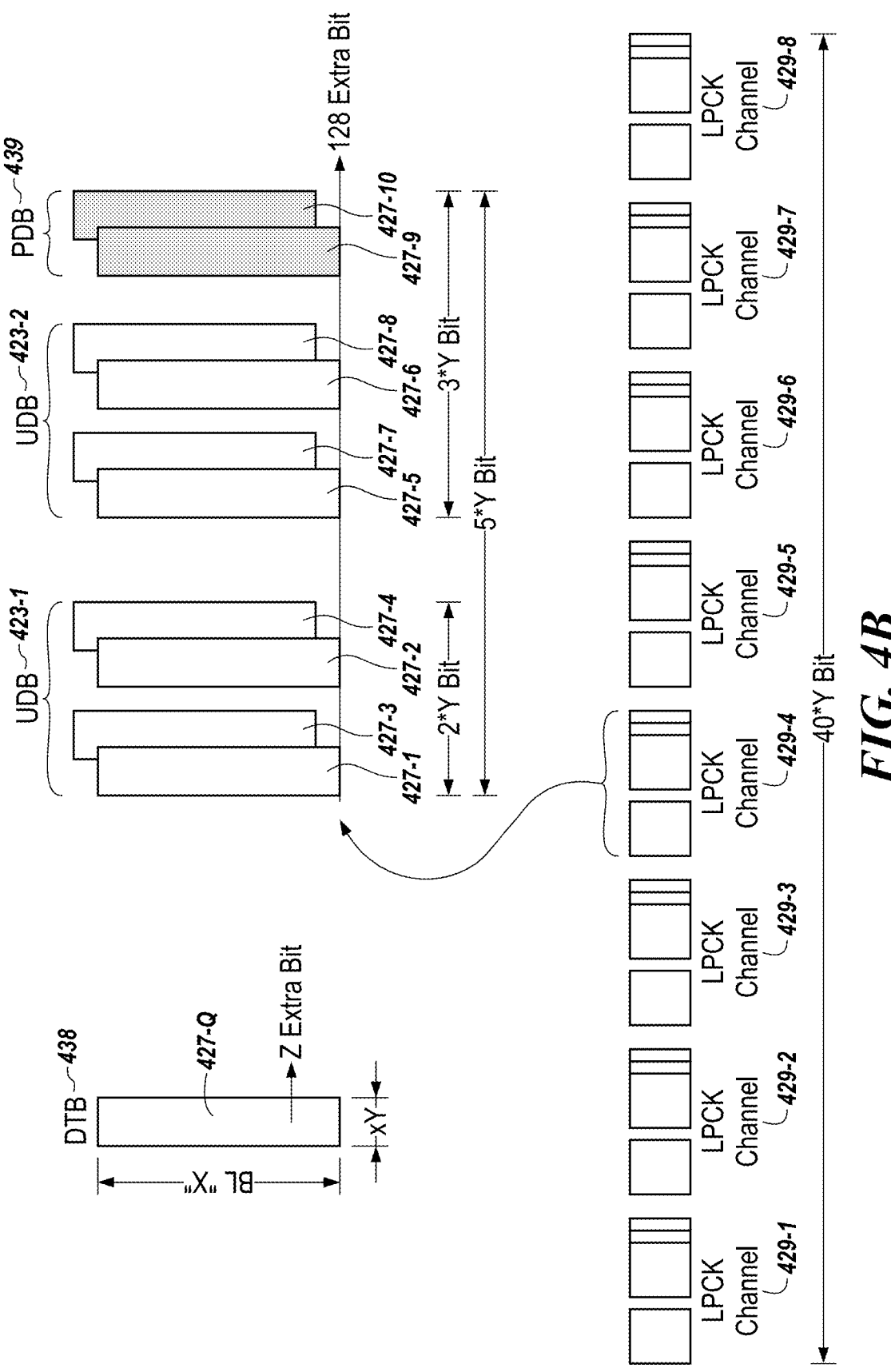
FIG. 4B is another block diagram of memory dice corresponding to one or more data protection (LPCK) channels in accordance with a number of embodiments of the present disclosure.

FIG. 4B is a block diagram of memory dice corresponding to a number of data protection (LPCK) channels in accordance with a number of embodiments of the present disclosure. An example memory die 427-Q (which can be analogous to one or more memory dice illustrated in FIG. 4B) can be generally analogous to the example memory die 427-P illustrated in FIG. 4A; however, a size of the memory die 427-Q can be different from the size of the 427-P. For example, 16 bytes of user data (of a DTB 438 stored in the memory die 427-Q can be transferred over 16-bit burst length with 8-bit data transfer (alternatively referred to as "x8 mode") for each beat of the 16-bit burst length, which transfers a total of 16-bit of auxiliary data from each memory die, such as the memory die 427-P.

Although embodiments are not so limited, two memory dice 427 can correspond to (e.g., a channel width of) the channel 125, 225, and/or 325 illustrated in FIGS. 1 and 2, respectively. For example, each pair of memory dice 427-1 and 427-3, 427-2 and 427-4, 427-5 and 427-7, 427-6 and 427-8, and 427-9 and 427-10 can correspond to a respective channel 125, 225, 325. Accordingly, each channel 125, 225, 325 can be 2*Y-bit wide (e.g., 16-bit wide).

FIG. 4B is further analogous to FIG. 4A, except that some memory dice 427 are internally coupled to the other memory dice without being externally coupled to the memory controller (e.g., the memory controller 100 and/or 200 illustrated in FIGS. 1, 2A, and 2B). For example, the memory dice 427-3, 427-3, 427-7, 427-8, and 427-10 (alternatively referred to as "secondary memory dice") can be internally coupled to the memory dice 427-1, 427-2, 427-5, 427-6, and 427-9 (alternatively referred to as "primary memory dice"), respectively, via a respective internal data link. Further, the memory dice 427-1, 427-2, 427-5, 427-6, and 427-9 can be coupled to the memory controller via a respective external link. As used herein, the term "primary memory die" refers to a memory die including an external data link. Further, as used herein, the term "secondary memory die" refers to a memory die including an internal data link.

Continuing with the example described above, data stored in the memory dice 427-3, 427-3, 427-7, 427-8, and 427-10 can be transferred to the memory controller via respective external links of the memory dice 427-1, 427-2, 427-5, 427-6, and 427-9 (e.g., without being directly transferred to the memory controller from the memory dice 427-3, 427-3, 427-7, 427-8, and 427-10). For example, given that the primary dice 427-1, 427-2, 427-5, 427-6, and 427-9 can be accessed simultaneously, the UDB 423-1 stored in the memory dice 427-1, . . . , 427-4 can be transferred over 32-bit burst length with a first 16-bit burst length to transfer data (e.g., 8-bit data transfer for each beat of the 16-bit burst length) from the primary memory dice 427-1 and 427-2 (during which data stored in the second memory dice 427-3 and 427-4 are transferred to the primary memory dice 427-1 and 427-2) and a second 16-bit burst length to transfer the data (e.g., 8-bit data transfer for each beat of the 16-bit burst length) that have been stored in the secondary memory dice 427-3 and 427-4 and from the primary memory dice 427-1 and 427-2.

Figure 4C:
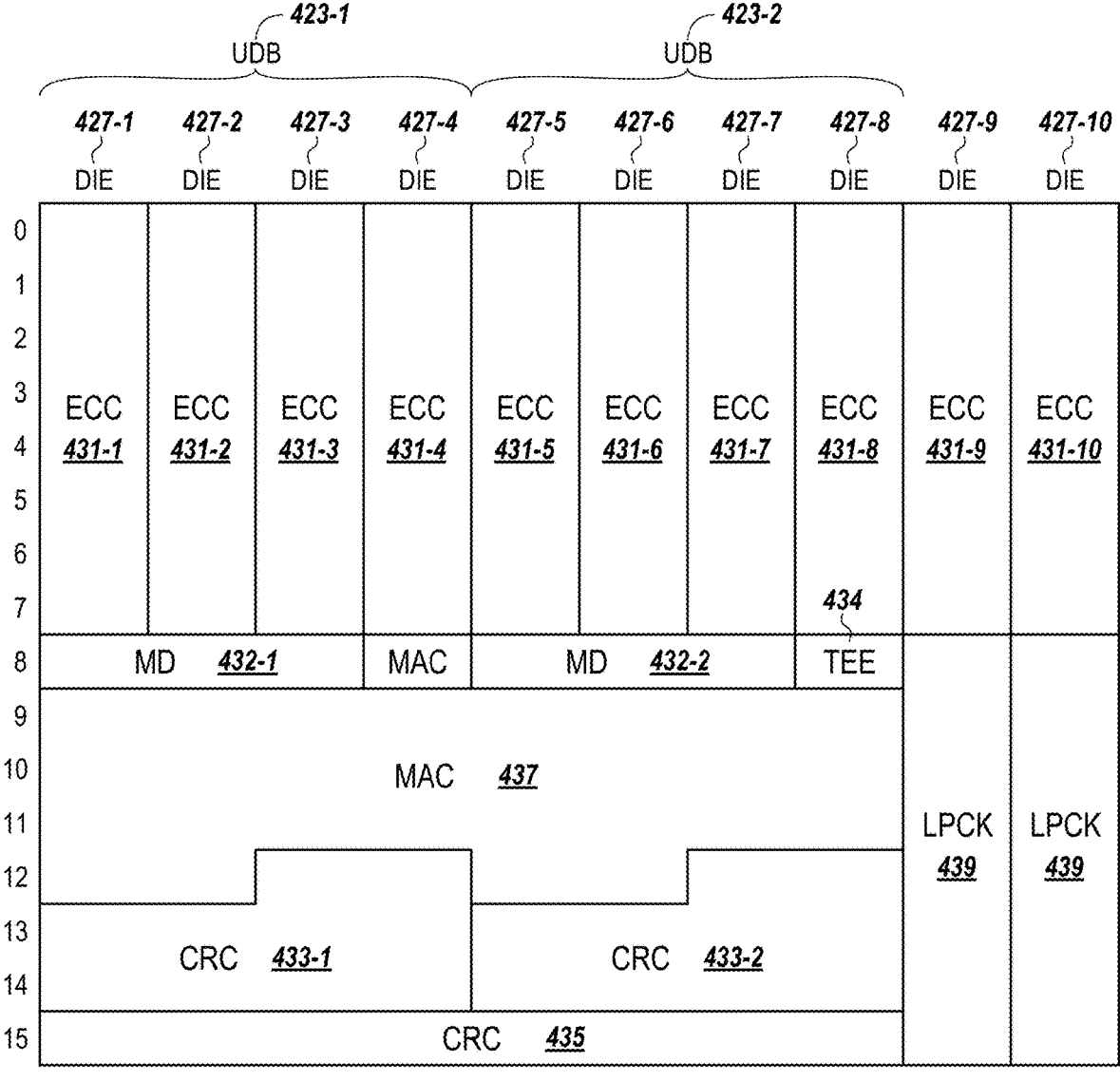
FIG. 4C-4D schematically illustrate various examples of how user data blocks (UDBs), LPCK parity data, and/or auxiliary data can be spread among memory dice in accordance with a number of embodiments of the present disclosure.
Figure 4D:
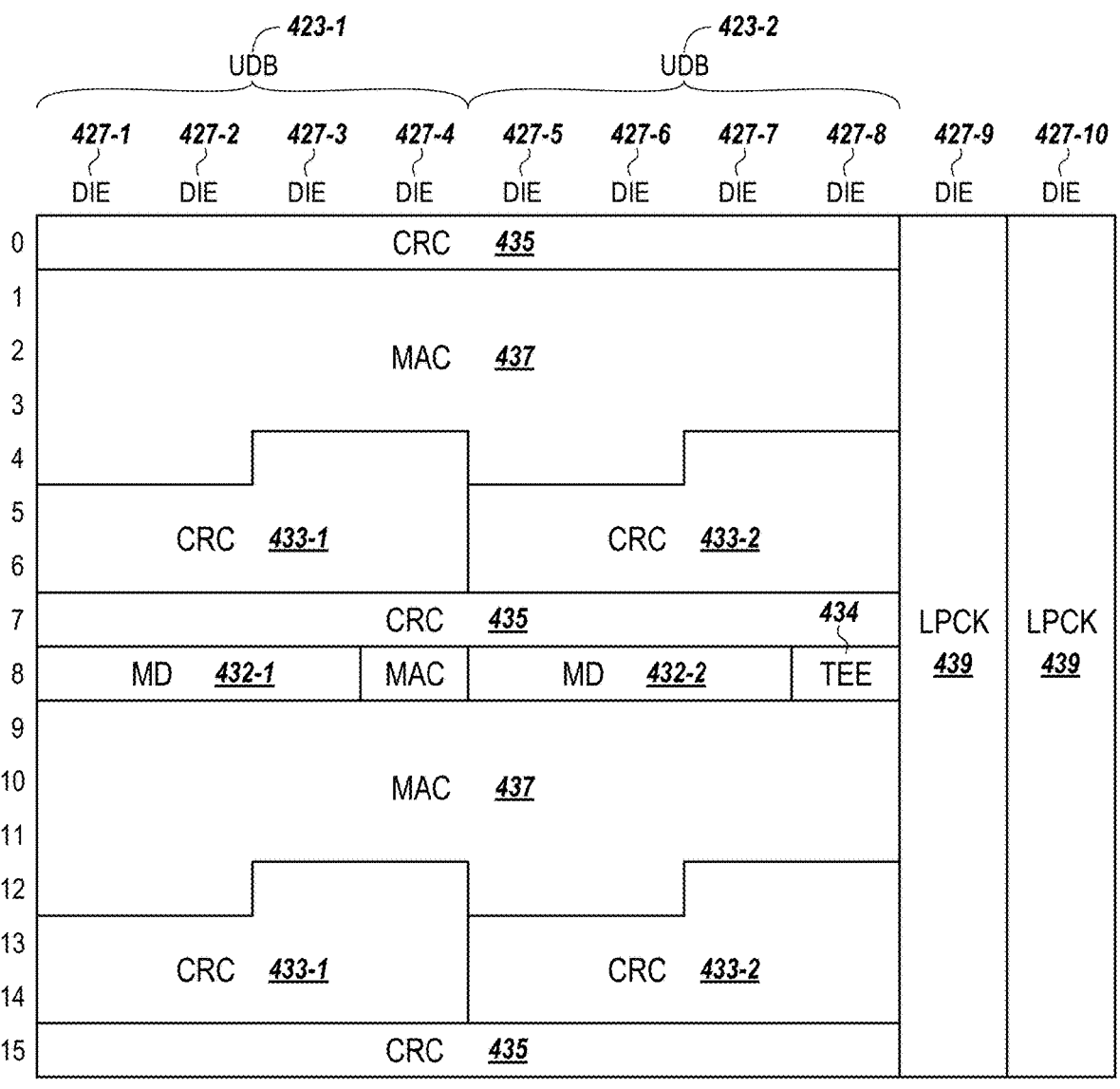

FIGS. 4C-4D illustrate various examples of how UDBs, LPCK parity data, and/or auxiliary data can be spread among memory devices in accordance with a number of embodiments of the present disclosure. Memory dice 427 illustrated in FIGS. 4C-4D can be analogous to memory dice 427-1, . . . , 427-10 of the LPCK channel illustrated in FIGS.

4A and/or 4B. Each memory die (e.g., memory die 427) illustrated in FIGS. 4C-4D is not illustrated in its entirety in FIGS. 4C-4D and can further include other portions that are not illustrated in FIGS. 4C-4D. For example, each memory die 427 can further include the other portions not illustrated in FIGS. 4C-4D that are configured to store, for example, UDBs. In some embodiments, data stored in these "portions" of the memory dice 427 illustrated in FIGS. 4C-4D can be transferred via DMI pins.

As illustrated in FIG. 4C, UDBs 423-1 and 423-2 can be stored over the memory dice, such as over memory dice 427-1 to 427-8. For example, the UDB 423-1 can be stored over the memory dice 427-1 to 427-4 and the UDB 423-2 can be stored over the memory dice 427-5 to 427-8. The PDB 439 (including LPCK parity data) stored over memory dice 427-9 and 427-10 can correspond to LPCK parity data generated at the LPCK encoder 214-1 to perform an LPCK operation on UDBs 423-1 and 423-2 stored in the memory dice 427-1, . . . , 427-8.

As illustrated in FIG. 4C, each memory die 427-1, . . . , 427-10 can be configured to store ECC data 431-1, . . . , 431-10 as illustrated in FIG. 4C. Each ECC data 431 can be used to perform an error correction operation (e.g., single-error-correction (SEC) operation) on a portion of the UDB 423 and/or PDB 439 stored in a same memory die. For example, the ECC data 431-1, . . . , 431-10 can be used to perform the error correction operation on the respective portion of the UDBs 423 and/or PDB 439 stored in the memory dice 427-1, . . . , 427-10.

As illustrated in FIG. 4C, CRC data 433-1 and 433-2 (e.g., alternatively referred to as error detection information) stored over the memory dice 427-1, . . . , 427-4 and 427-5, . . . , 427-8, respectively, can correspond to CRC data generated at the CRC encoder 211-1 illustrated in FIG. 2A. CRC data 433-1 can be used (e.g., at the CRC decoder 211-2) to perform an error detection operation on the UDB 423-1 and CRC data 433-2 can be used (e.g., at the CRC decoder 213-2) to perform an error detection operation on the UDB 423-2 stored on the memory dice 427-1, . . . , 427-8. As illustrated in FIG. 4C, CRC data 435 (e.g., alternatively referred to as error detection information) stored over memory dice 427-1, . . . , 427-8 can correspond to CRC data generated at the CRC encoder 213-1 illustrated in FIGS. 2A and 2B. The CRC data 435 can be used (e.g., at a respective CRC decoder 213-2) to perform an error detection operation on the UDBS 423-1 and 423-2 stored over the memory dice 427-1, . . . , 427-8.

As illustrated in FIG. 4C, MAC data 437 (e.g., alternatively referred to as authentication data) stored over memory dice 427-1, . . . , 427-8 can correspond to authentication data generated at the authentication encoder (e.g., authentication encoder 218-1 illustrated in FIGS. 2A and 2B). MAC data 437 can be used to perform an authentication operation on the UDBs 423-1 and 432-2 stored over the memory dice 427-1, . . . , 427-8.

As illustrated in FIG. 4C, metadata ("MD" as shown in FIG. 4C) 432-1 and 432-2 stored in memory dice 427-1, . . . , 427-3 and 427-4, . . . , 427-6, respectively, can correspond to meta data associated with each UDB 423-1 and 423-2 stored over the memory dice 427-1, . . . , 427-8. Further, the memory devices 426 can be configured to store TEE data 434, such as in the memory die 427-8 as illustrated in FIG. 4C.

Turning to FIG. 4D, CRC data 433-1 and 433-2, CRC data 435, MAC data 437, PDB 439, metadata 432-1 and 432-2, and TEE 434 illustrated in FIG. 4D can be analogous to the CRC data 433-1 and 433-2, CRC data 435, MAC data 437, PDB 439, metadata 432-1 and 432-2, and TEE 434 illustrated in FIG. 4C.

Unlike the memory dice 427 illustrated in FIG. 4C, the memory dice 427-1, . . . , 427-10 of FIG. 4D are not configured to store ECC data (e.g., ECC data 431 illustrated in FIG. 4C), which indicates that the memory controller 200 operating with extra bits stored in the memory dice 427 as illustrated in FIG. 4C may disable the pairs of ECC encoders/decoders 216 and operate without performing error correction operations that would have been performed at the pairs.

In a non-limiting example, an apparatus (e.g., the computing device 101 illustrated in FIG. 1) can include a first number of memory units (e.g., the memory dice 427-1, . . . , 427-8 and/or 527-1, . . . , 527-8 illustrated in FIGS. 4A-4B and/or 5A) configured to store a user data block (UDB) (e.g., one or more UDBs 432 and/or 532 illustrated in FIGS. 4A-4B and/or 5A). Each memory unit of the first number of memory units can include a respective first portion comprising a number of data pins having a first type and configured to store a respective portion of the UDB (e.g., a portion of the UDB stored in each memory unit). Each memory unit of the first number of memory units can further include a respective second portion comprising a number of data pins having a second type and configured to store auxiliary data. The auxiliary data corresponds to the UDB and comprises at least authentication data (e.g., the MAC data 437, 537 illustrated in FIGS. 4C-4D and 5B, respectively) to protect data integrity and authenticity of the UDB. The apparatus can further include a second number of memory units (e.g., the memory dice 427-9 and 427-10 and/or 527-9 illustrated in FIGS. 4A-4B and/or 5A) configured to store (e.g., in forms of a PDB 439 and/or 539 illustrated in FIGS. 4 and 5) corresponding to the UDB.

In some embodiments, a data pin having the first type corresponds to a data input/output (DQ) bus and a data pin having the second type corresponds to a data mask inversion (DMI) pin. In some embodiments, each memory unit of the first number of memory units or the second number of memory units is configured to transfer four bits of data per each beat.

In some embodiments, the apparatus can include (e.g., can be) a Compute Express Link (CXL)-compliant memory system that includes the first and the second number of memory units. The memory system can be configured to operate according to a CXL 3.0 protocol that is built based on a peripheral component interconnect express (PCIe) 6.0 protocol.

Figure 5A:
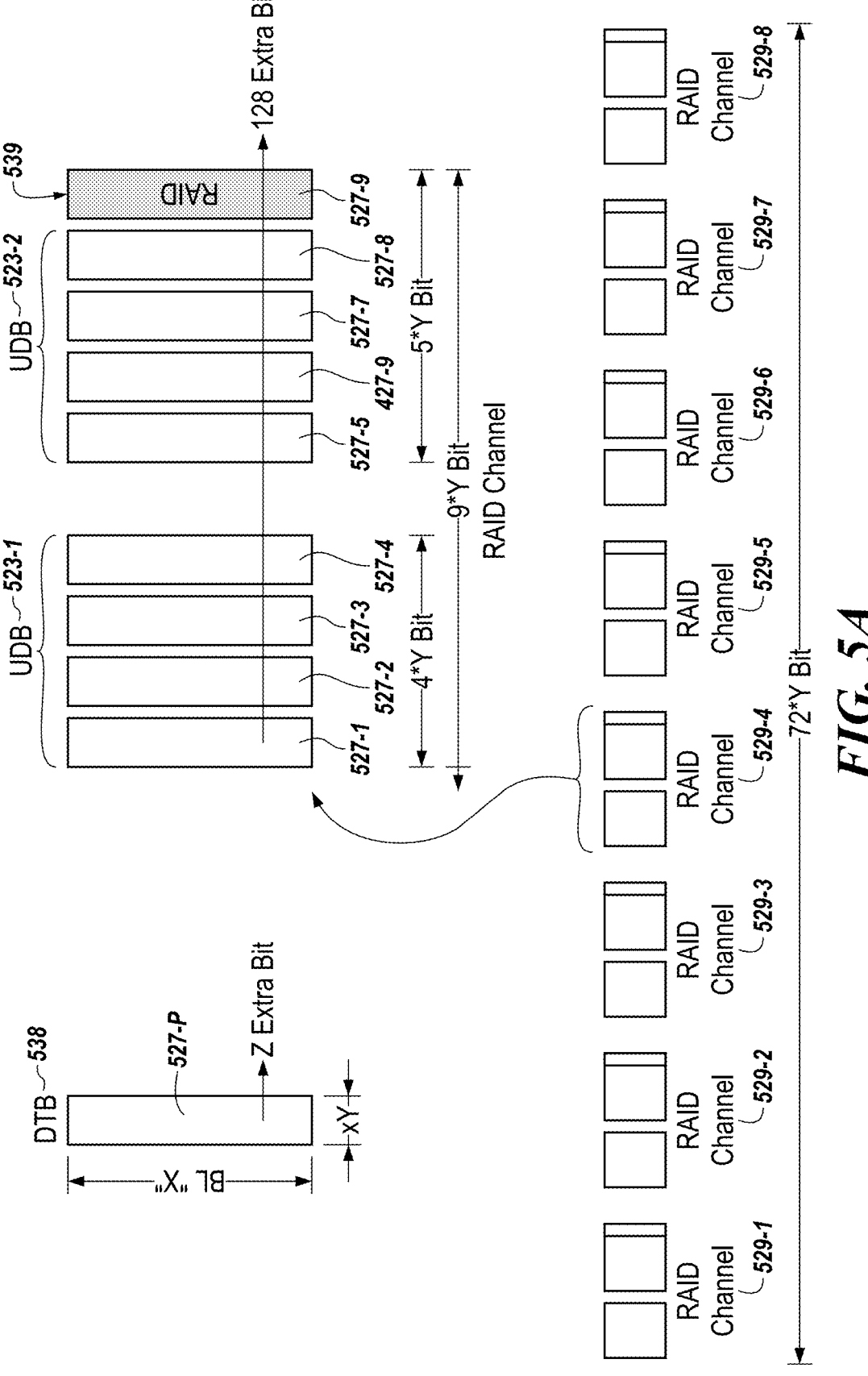
FIG. 5A is a block diagram of memory dice corresponding to one or more data protection (RAID) channels in accordance with a number of embodiments of the present disclosure.

In some embodiments, the first number of memory units are configured to store plurality of UDBs including a first UDB (e.g., the UDB 423-1 and/or 523-1 illustrated in FIGS. 4A-4B and 5A) and a second UDB (e.g., the UDB 423-2 and/or 523-2 illustrated in FIGS. 4A-4B and 5A). In this example, the auxiliary data can include first error detection information (e.g., the CRC data 435 and/or 535 illustrated in FIGS. 4C-4D and 5B, respectively) generated collectively on the plurality of UDBs, second error detection information (e.g., the CRC data 433 and/or 533 illustrated in FIGS. 4C-4D and 5B, respectively) generated based individually on the first UDB of the plurality of UDBs, and third error detection information (e.g., the CRC data 433 and/or 533 illustrated in FIGS. 4C-4D and 5B, respectively) generated based individually on the second UDB of the plurality of UDBs. The first, second, and third error detection information can correspond to cyclic redundancy check (CRC) data.

In some embodiments, each memory unit of the second number of memory units can include a respective first portion comprising a number of data pins having the first type and configured to store a respective portion of the parity data. Each memory unit of the second number of memory units can further include a respective second portion comprising a number of data pins having the second type and configured to store auxiliary data corresponding to the parity data. In this example, the auxiliary data can include error correction information to correct a particular quantity of bit errors in a portion of the parity data corresponding to a respective memory unit of the second number of memory units.

In some embodiments, the auxiliary data stored in the respective second portion of each memory unit of the first number of memory units can further include error correction information (e.g., the ECC data 431 and/or 531 illustrated in FIGS. 4C and 5B) corresponding to the UDB. The error correction information can be to correct a particular quantity of bit errors in the respective portion of the UDB.

FIG. 5A is a block diagram of memory dice corresponding to one or more data protection (RAID) channels in accordance with a number of embodiments of the present disclosure. An example memory die 527-P configured to store a DTB and illustrated in FIG. 5A is analogous to the example memory die 427-P. In some embodiments, DTB 538 can be transferred over 16-bit burst length with 4-bit data transfer for each beat of the 16-bit burst length, which also transfers a total of 16-bit of auxiliary data from each memory die, such as the memory die 527-P. Further, eight memory dice 527-1, . . . , 527-8 over which UDBs 523-1 and 523-2 are stored can be analogous to eight memory dice 427-1, . . . , 427-4 and 427-5, . . . , 427-8 over which the UDBs 423-1 and 423-2 are stored. The UDB 532-1 and 532-2 can form a MTB, which further corresponds to a cache line of the cache 212 and/or 312 illustrated in FIGS. 2 and 3, respectively.

Although embodiments are not so limited, four memory dice 427 can correspond to (e.g., a channel width of) the channel 125, 225, and/or 325 illustrated in FIGS. 1 and 2, respectively. For example, memory dice 527-1, . . . , 527-4 can correspond to one channel 125, 225, 325, while memory dice 527-6, . . . , 527-10 can correspond to a different channel 125, 225, 325. Accordingly, each channel 125, 225, 325 can be 4*Y-bit wide (e.g., 16-bit wide).

Although embodiments are not so limited, each RAID channel can include one memory die (e.g., memory die 527-9) configured to store a PDB 539 including RAID parity data used to perform a RAID operation on one of the memory dice 527-1, . . . , 527-8 of each RAID channel, for example. Accordingly, each RAID channel can include eight memory dice 527-1, . . . , 527-8 (configured to store UDBs) and one memory die 527-9 (configured to store a PDB), which can be collectively referred to as a RAID channel. Accordingly, 9*Y bits (e.g., 36 bits) can be transferred for each beat of the X-bit burst length. These nine memory dice 527-1, . . . , 527-9 can be accessed simultaneously (e.g., substantially simultaneously as defined herein).

The computing system (e.g., the computing system 101 illustrated in FIG. 1) can include a number of RAID channels, such as eight RAID channels 529-1, . . . , 529-8 (which can transfer 72*Y bits, such as 288 bits, for each beat of the X-bit burst length) as illustrated in FIG. 5A, although embodiments are not limited to a particular quantity of RAID channels the computing system can include. Each RAID channel 529 can be a unit of RAID access. For example, each UDB respectively stored in the respective RAID channel 529 can be restored by the RAID operation that uses data (e.g., PDB) stored in one or more memory dice of (e.g., corresponding to) the same RAID channel 529.

Figure 5B:
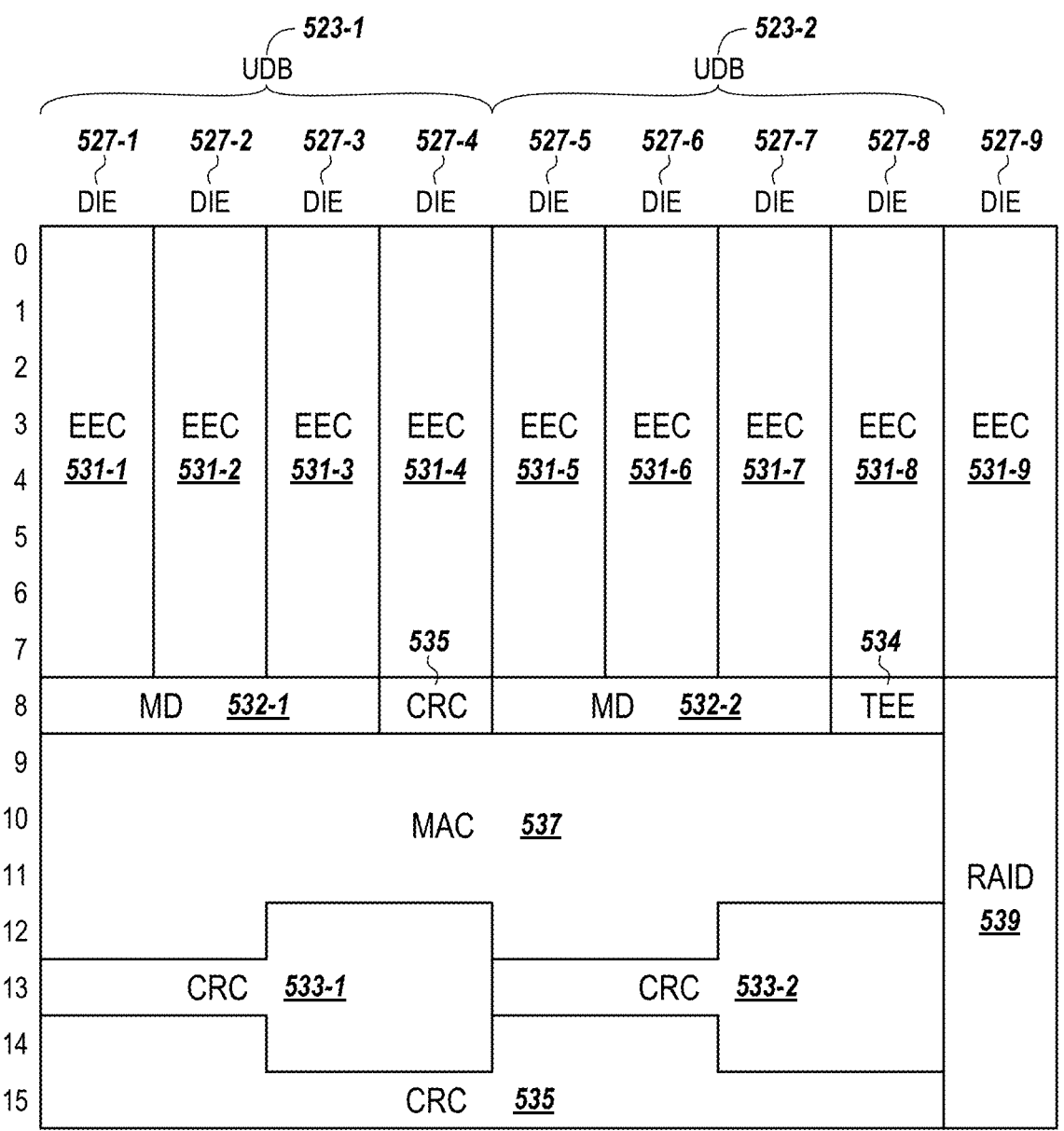
FIG. 5B schematically illustrates various examples of how user data blocks (UDBs), RAID parity data, and/or auxiliary data can be spread among memory dice in accordance with a number of embodiments of the present disclosure.

FIG. 5B illustrates an example of how UDBs, LPCK parity data, and/or auxiliary data can be spread among memory devices in accordance with a number of embodiments of the present disclosure. Memory dice 527 illustrated in FIG. 5B can be analogous to memory dice 527-1, . . . , 527-10 of the LPCK channel illustrated in FIG. 5A. Each memory die (e.g., memory die 527) illustrated in FIG. 5B is not illustrated in its entirety in FIG. 5B and can further include other portions that are not illustrated in FIG. 5B. For example, each memory die 527 can further include the other portions not illustrated in FIG. 5B that are configured to store, for example, UDBs. In some embodiments, data stored in these "portions" of the memory dice 527 illustrated in FIG. 5B can be transferred via DMI pins.

UDBs 523-1 and 523-2 can be stored over the memory dice, such as over memory dice 527-1 to 527-8. For example, the UDB 523-1 can be stored over the memory dice 527-1 to 527-4 and the UDB 523-2 can be stored over the memory dice 527-5 to 527-8. PDB 539 (including RAID parity data) stored over memory dice 527-9 and 527-9 can correspond to RAID parity data generated at the RAID encoder 314-1 illustrated in FIGS. 3A and/or 3B to perform a RAID operation on UDBs 523-1 and 523-2, and/or PDB 539 stored in the memory dice 527-1, . . . , 527-9.

Each memory die 527-1, . . . , 527-9 can be configured to store ECC data 531-1, . . . , 531-9 as illustrated in FIG. 5C. Each ECC data 531 can be used to perform an error correction operation (e.g., single-error-correction (SEC) operation) on a portion of the UDB 523 and/or PDB 539 stored in a same memory die. For example, the ECC data 531-1, . . . , 531-9 can be used to perform the error correction operation on the respective portion of the UDBs 523-1 and 523-2, and/or PDB 539 stored in the memory dice 527-1, . . . , 527-9, respectively.

CRC data 533-1 and 533-2 (e.g., alternatively referred to as error detection information) stored over the memory dice 527-1, . . . , 527-4 and 527-5, . . . , 527-8, respectively, can correspond to CRC data generated at the CRC encoder 311-1 illustrated in FIG. 3A. CRC data 533-1 can be used (e.g., at the CRC decoder 311-2) to perform an error detection operation on the UDB 523-1 and CRC data 533-2 can be used (e.g., at the CRC decoder 313-2) to perform an error detection operation on the UDB 523-2 stored on the memory dice 527-1, . . . , 527-8. As illustrated in FIG. 5C, CRC data 535 (e.g., alternatively referred to as error detection information) stored over memory dice 527-1, . . . , 527-8 can correspond to CRC data generated at the CRC encoder 213-1 illustrated in FIGS. 3A and 3B. The CRC data 535 can be used (e.g., at a respective CRC decoder 313-2) to perform an error detection operation on the UDBs 523-1 and 523-2 stored over the memory dice 527-1, . . . , 527-8.

MAC data 537 (e.g., alternatively referred to as authentication data) stored over memory dice 527-1, . . . , 527-8 can correspond to authentication data generated at the authentication encoder (e.g., authentication encoder 218-1 illustrated in FIGS. 2A and 2B). MAC data 537 can be used to perform an authentication operation on the UDBs 523-1 and 532-2 stored over the memory dice 527-1, . . . , 527-8.

Metadata ("MD" as shown in FIG. 5C) 532-1 and 532-2 stored in memory dice 527-1, . . . , 527-3 and 527-4, . . . , 527-6, respectively, can correspond to meta data associated with each UDB 523-1 and 523-2 stored over the memory dice 527-1, . . . , 527-8. Further, the memory devices 526 can be configured to store TEE data 534, such as in the memory die 527-8 as illustrated in FIG. 5C.

In another non-limiting example, an apparatus (e.g., the computing device 101 illustrated in FIG. 1) can include a first number of memory units (e.g., the memory dice 427-1, . . . , 427-8 and/or 527-1, . . . , 527-8 illustrated in FIGS. 4A-4B and/or 5A) configured to store a plurality of user data blocks (UDBs) (e.g., one or more UDBs 432 and/or 532 illustrated in FIGS. 4A-4B and/or 5A). Each memory unit of the first number of memory units can include a respective first portion that includes a number of data pins and can be configured to store a respective portion of the UDB. Each memory unit of the first number of memory units can further include a respective second portion simultaneously accessible with the respective first portion. The respective second portion can include a number of data mask inversion (DMI) pins and can be configured to store auxiliary data. The auxiliary data can correspond to the UDB and comprises at least authentication data (e.g., the MAC data 437, 537 illustrated in FIGS. 4C-4D and 5B, respectively) to protect data integrity and authenticity of the UDB. In some embodiments, the auxiliary data can include message authentication code (MAC) data generated based collectively on the plurality of UDBs. The apparatus can further include a second number of memory units (e.g., the memory dice 427-9 and 427-10 and/or 527-9 illustrated in FIGS. 4A-4B and/or 5A) configured to store parity data (e.g., in forms of a PDB 439 and/or 539 illustrated in FIGS. 4 and 5) corresponding to the UDB.

In some embodiments, each memory unit of the first and the second number of memory units can correspond to a memory die (e.g., the memory die 427 and/or 527 illustrated in FIGS. 4C-4D and 5B). In some embodiments, each memory unit of the first number of memory units or the second number of memory units can be configured to transfer four bits of data per each beat.

In some embodiments, the first or the second number of memory units can include a pair of linked memory units (e.g., the pair of memory dice 427-1 and 427-3, 427-2 and 427-4, 427-5 and 427-7, 427-6 and 427-8, and/or 427-9 and 427-10 illustrated in FIG. 4B). The pair of memory units can include a first memory unit of the pair (e.g., the memory unit 427-1, 427-2, 427-5, 427-6, and/or 427-9 illustrated in FIG. 4B) configured to transfer data via an external data link and a second memory unit of the pair (e.g., the memory unit 427-3, 427-4, 427-7, 427-8, and/or 427-10 illustrated in FIG. 4B) coupled to the first memory unit via an internal data link. In this example, the second memory unit of the pair can be configured to transfer data to the first memory unit of the pair via the internal data link to cause the first memory unit of the pair to further transfer the data via the external data link.

FIG. 6 is a flow diagram 650 of a method for memory units of memory system operation in accordance with a number of embodiments of the present disclosure. The method 650 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 650 is performed by the memory controller 100, 200, and/or 300 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 651, a number of user data blocks (UDBs) e.g., one or more UDBs 432 and/or 532 illustrated in FIGS. 4A-4B and/or 5A) can be transferred from respective first portions of a first number of memory units (e.g., the memory dice 427-1, . . . , 427-8 and/or 527-1, . . . , 527-8 illustrated in FIGS. 4A-4B and/or 5A) via one or more data pins and at a rate of four bits per beat. At 653, auxiliary data corresponding to the number of UDBs can be transferred simultaneously with transferring the number of UDBs from the first number of memory units from respective second portions of the first number of memory units via one or more data mask inversion (DMI) pins at a rate of four bits per beat.

At 655, a parity data block (PDB) (e.g., the PDB 439 and/or 539 illustrated in FIGS. 4 and/or 5) can be transferred from a second number of memory units (e.g., the memory dice 427-9 and 427-10 and/or 527-9 illustrated in FIGS. 4A-4B and/or 5A) at a rate of four bits per beat and simultaneously with the number of UDBs transferred from the first number of memory units. In some embodiments, error correction information (e.g., the ECC data 431-9, 431-10, and/or 531-9 illustrated in FIGS. 4C and 5B) corresponding to the parity data block can be transferred from the second number of memory units via a number of DMI pins at a rate of four bits per beat. In this example, an error correction operation can be performed on the PDB using the error correction information to correct a particular quantity of bit errors in the PDB.

In some embodiments, an error correction operation can be performed on the UDB using the PDB to recover a portion of the UDB corresponding to at least one memory unit of the first number of memory units. Continuing with this example, the auxiliary data can include error detection information (e.g., the CRC data 435 and/or 535 illustrated in FIGS. 4C-4D and 5B, respectively) generated collectively on the number of UDBs. In one example, an error detection operation can be performed on the number of UDBs using the error detection information and the error correction operation can be performed on the number of UDBs to recover a portion of the number of UDBs corresponding to one memory unit of the first number of memory units responsive to the error detection operation indicating the number of UDBs having an amount of bit errors.

Alternatively, in another example, the error correction operation can be performed on the number of UDBs to recover a portion of the number of UDBs corresponding to one memory unit of the first number of memory units. An error detection operation can be performed on the number of UDBs using the error detection information subsequent to performing the error correction operation.

Alternatively, in a different example, a number of error correction operations can be performed on respective portions of the UDB each corresponding to a respective memory unit of the first number of memory units. In this example, a number of error detection operation can be performed respectively on results of the number of error correction operations to determine which one of the results does not contain an amount of bit errors.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a first number of memory units configured to store a user data block (UDB), each memory unit of the first number of memory units comprising:
   a respective first portion comprising a number of data pins having a first type and configured to store a respective portion of the UDB; and
   a respective second portion comprising a number of data pins having a second type and configured to store auxiliary data, wherein the auxiliary data corresponds to the UDB and comprises at least authentication data to protect data integrity and authenticity of the UDB; and
   a second number of memory units configured to store parity data corresponding to the UDB, wherein the apparatus comprises a Compute Express Link (CXL)-compliant memory system that includes the first and the second number of memory units.

2. The apparatus of claim 1, wherein:
   a data pin having the first type corresponds to a data input/output (DQ) bus; and
   a data pin having the second type corresponds to a data mask inversion (DMI) pin.

3. The apparatus of claim 1, wherein each memory unit of the first number of memory units or the second number of memory units is configured to transfer four bits of data per each beat.

4. The apparatus of claim 1, wherein the first number of memory units are configured to store plurality of UDBs including a first UDB and a second UDB, and wherein the auxiliary data further comprises:
   first error detection information generated based collectively on the plurality of UDBs;
   second error detection information generated based individually on the first UDB of the plurality of UDBs; and
   third error detection information generated based individually on the second UDB of the plurality of UDBs.

5. The apparatus of claim 1, wherein each memory unit of the second number of memory units further comprises:
   a respective first portion comprising a number of data pins having the first type and configured to store a respective portion of the parity data; and a respective second portion comprising a number of data pins having the second type and configured to store auxiliary data corresponding to the parity data.

6. The apparatus of claim 5, wherein the auxiliary data further comprises error correction information to correct a particular quantity of bit errors in a portion of the parity data corresponding to a respective memory unit of the second number of memory units.

7. The apparatus of claim 1, wherein the auxiliary data stored in the respective second portion of each memory unit of the first number of memory units further comprises error correction information corresponding to the UDB and to correct a particular quantity of bit errors in the respective portion of the UDB.

8. An apparatus, comprising:
a first number of memory units configured to store a plurality of user data blocks (UDBs), each memory unit of the first number of memory units further comprising:
a respective first portion comprising a number of data pins and configured to store a respective portion of the plurality of UDBs; and
a respective second portion simultaneously accessible with the respective first portion, the respective second portion comprising a number of data mask inversion (DMI) pins and configured to store auxiliary data, wherein the auxiliary data corresponds to the plurality of UDBs and comprises at least authentication data to protect data integrity and authenticity of the plurality of UDBs; and
a second number of memory units configured to store parity data corresponding to the plurality of UDBs;
wherein the apparatus comprises a Compute Express Link (CXL)-compliant memory system that includes the first and the second number of memory units.

9. The apparatus of claim 8, wherein the auxiliary data comprises message authentication code (MAC) data generated based collectively on the plurality of UDBs.

10. The apparatus of claim 8, wherein each memory unit of the first and the second number of memory units corresponds to a memory die.

11. The apparatus of claim 8, wherein each memory unit of the first number of memory units or the second number of memory units is configured to transfer four bits of data per each beat.

12. The apparatus of claim 8, wherein the first or the second number of memory units comprises a pair of linked memory units, the pair of memory units further comprising:
a first memory unit of the pair configured to transfer data via an external data link; and
a second memory unit of the pair coupled to the first memory unit via an internal data link.

13. The apparatus of claim 12, wherein the second memory unit of the pair is configured to transfer data to the first memory unit of the pair via the internal data link to cause the first memory unit of the pair to further transfer the data via the external data link.

14. A method, comprising:
transferring a number of user data blocks (UDBs) from respective first portions of a first number of memory units via one or more data pins and at a rate of four bits per beat;
transferring, simultaneously with transferring the number of UDBs from the first number of memory units, auxiliary data corresponding to the number of UDBs from respective second portions of the first number of memory units via one or more data mask inversion (DMI) pins at a rate of four bits per beat;

transferring, simultaneously with transferring the number of UDBs from the first number of memory units, a parity data block (PDB) from a second number of memory units at a rate of four bits per beat;
performing an error correction operation on the number of UDBs to recover a portion of the number of UDBs corresponding to at least one memory unit of the first number of memory units, wherein the auxiliary data further comprises error detection information generated based collectively on the number of UDBs; and
performing an error detection operation on the number of UDBs using the error detection information subsequent to performing the error correction operation.

15. The method of claim 14, further comprising:
transferring error correction information corresponding to the parity data block from the second number of memory units via a number of DMI pins at a rate of four bits per beat; and
performing an error correction operation on the PDB using the error correction information to correct a particular quantity of bit errors in the PDB.

16. The method of claim 14, further comprising:
performing another error detection operation on the number of UDBs using the error detection information prior to performing the error correction operation; and
performing the error correction operation on the number of UDBs responsive to the error detection operation indicating the number of UDBs having an amount of bit errors.

17. The method of claim 14, wherein performing the error correction operation on the number of UDBs using the PDB further comprises:
performing a number of error correction operations on respective portions of the number of UDBs each corresponding to a respective memory unit of the first number of memory units; and
performing a number of error detection operation respectively on results of the number of error correction operations to determine which one of the results does not contain an amount of bit errors.

18. An apparatus, comprising:
a first number of memory units configured to store a user data block (UDB), each memory unit of the first number of memory units comprising:
a respective first portion comprising a number of data pins having a first type and configured to store a respective portion of the UDB; and
a respective second portion comprising a number of data pins having a second type and configured to store auxiliary data, wherein the auxiliary data corresponds to the UDB and comprises at least authentication data to protect data integrity and authenticity of the UDB; and
a second number of memory units configured to store parity data corresponding to the UDB, wherein the first number of memory units are configured to store a plurality of UDBs including a first UDB and a second UDB, and wherein the auxiliary data further comprises:
first error detection information generated based collectively on the plurality of UDBs;
second error detection information generated based individually on the first UDB of the plurality of UDBs; and
third error detection information generated based individually on the second UDB of the plurality of UDBs.

19. An apparatus, comprising:

a first number of memory units configured to store a user data block (UDB), each memory unit of the first number of memory units comprising:

a respective first portion comprising a number of data pins having a first type and configured to store a respective portion of the UDB; and a respective second portion comprising a number of data pins having a second type and configured to store auxiliary data, wherein the auxiliary data corresponds to the UDB and comprises at least authentication data to protect data integrity and authenticity of the UDB; and a second number of memory units configured to store parity data corresponding to the UDB, wherein each memory unit of the second number of memory units further comprises:

a respective first portion comprising a number of data pins having the first type and configured to store a respective portion of the parity data; and a respective second portion comprising a number of data pins having the second type and configured to store auxiliary data corresponding to the parity data.

20. An apparatus, comprising:

a first number of memory units configured to store a user data block (UDB), each memory unit of the first number of memory units comprising:

a respective first portion comprising a number of data pins having a first type and configured to store a respective portion of the UDB; and a respective second portion comprising a number of data pins having a second type and configured to store auxiliary data, wherein the auxiliary data corresponds to the UDB and comprises at least authentication data to protect data integrity and authenticity of the UDB; and a second number of memory units configured to store parity data corresponding to the UDB, wherein the auxiliary data further comprises error correction information to correct a particular quantity of bit errors in a portion of the parity data corresponding to a respective memory unit of the second number of memory units.

* * * * *